United States Patent [19]

Loffredo

[11] Patent Number: 5,016,876
[45] Date of Patent: May 21, 1991

[54] VIDEO DISPLAY CO-PROCESSOR FOR USE IN A VIDEO GAME

[75] Inventor: Mark D. Loffredo, Ingleside, Ill.

[73] Assignee: Williams Electronics Games, Inc., Chicago, Ill.

[21] Appl. No.: 257,724

[22] Filed: Oct. 14, 1988

[51] Int. Cl.⁵ ............................ A63F 9/22; G09G 5/00
[52] U.S. Cl. ............................ 273/437; 273/DIG. 28; 340/725; 340/720
[58] Field of Search ............... 340/703, 723, 725, 724, 340/727; 273/DIG. 28, 1 E

[56] References Cited

U.S. PATENT DOCUMENTS

| | | | |
|---|---|---|---|
| 3,991,266 | 11/1976 | Baer | 273/DIG. 28 |
| 4,498,079 | 2/1985 | Ghosh et al. | 340/725 |
| 4,572,506 | 2/1986 | Di Orio | 273/DIG. 28 |
| 4,600,200 | 7/1986 | Oka et al. | 273/DIG. 28 |
| 4,777,485 | 10/1988 | Costello | 340/725 |
| 4,777,621 | 10/1988 | Miner et al. | 364/900 |
| 4,825,390 | 4/1989 | Van Aken et al. | 340/720 |
| 4,827,250 | 5/1989 | Stallkamp | 340/747 |
| 4,829,291 | 5/1989 | Elgood et al. | 340/703 |
| 4,829,455 | 5/1989 | Long et al. | 340/703 |
| 4,831,368 | 5/1989 | Masimo et al. | 340/724 |
| 4,841,291 | 6/1989 | Swix et al. | 340/724 |
| 4,855,813 | 8/1989 | Russel et al. | 358/903 |
| 4,874,164 | 10/1989 | Miner et al. | 273/DIG. 28 |

Primary Examiner—Edward M. Coven
Assistant Examiner—Jessica J. Harrison
Attorney, Agent, or Firm—Rockey and Rifkin

[57] ABSTRACT

Disclosed is a bit mapped raster display video game that includes a Direct Memory Access ("DMA") co-processor especially adapted for providing real-time animation of the image data. The DMA co-processor is adapted for combining multiple overlapping planes of image data occupying an addressable image area greater than that displayable on a video display during the time interval of a single video raster scan. As the image data is being combined, the DMA co-processor can also manipulate it to produce real-time animation. The DMA co-processor includes a Source Address Generation ("SAG") functional unit that generates the addresses of locations in an image memory from which image data is to be retrieved. Retrieved image data is manipulated within a Data Pipe ("DP") functional unit to provide images that move smoothly across the screen. Manipulated image data is stored into a bit map memory at address locations specified by a Destination Address Generation ("DAG") functional unit. A Control Section ("CS") functional unit receives image processing commands from a supervisory ditigal computer included in the video game to control the operation of the SAG, DP and DAG functional units.

20 Claims, 8 Drawing Sheets

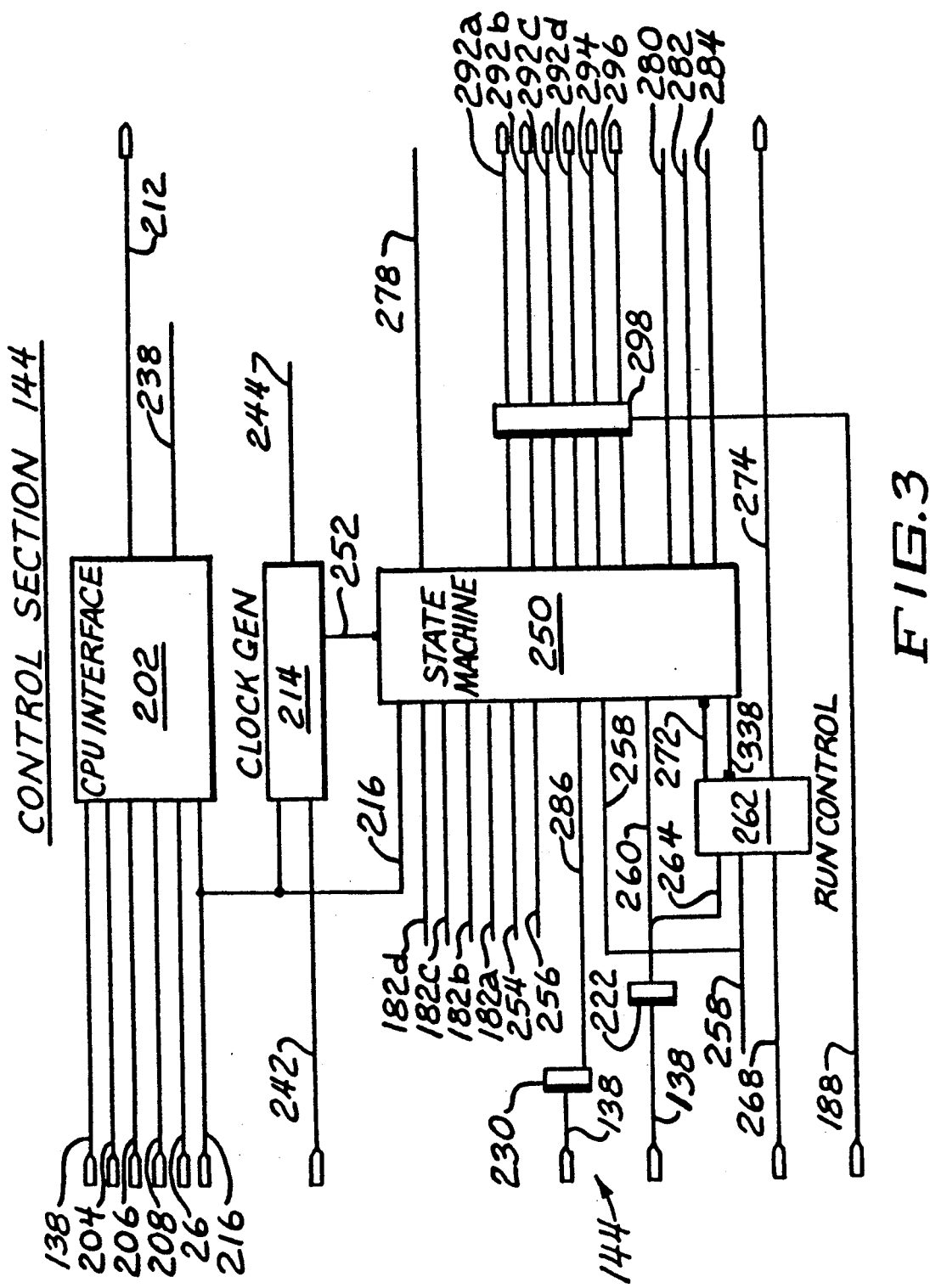

| ADDRESS | ADDRESSABLE UNIT |
|---|---|
| FFFF FFFF <br> \| <br> FFC0 0000 | Program Memory 30 |
| 03FF FFFF <br> \| <br> 0200 0000 | Image Memory 34 |
| 01F0 0000 | System Control Register 502 |
| 01E0 0000 | Sound Generator 94 |
| 01C0 0020 <br> \| <br> 01C0 0000 | I/O Functional Unit 112 |
| 01A0 0090 | DMA Constant Register 184 |
| 01A0 0080 | Palette Latch 84 |
| 01A0 0070 | DMA Vertical Size Register 236 |
| 01A0 0060 | DMA Horizontal Size Register 234 |
| 01A0 0050 | DMA Y-Coordinate Destination Address Register 232 |
| 01A0 0040 | DMA X-Coordinate Destination Address Register 230 |
| 01A0 0030 | DMA MSW Source Address Register 226b |
| 01A0 0020 | DMA LSW Source Address Register 226a |
| 01A0 0010 | DMA Source Address Offset Register 224 |
| 01A0 0000 | DMA Control Register 222 |
| 0180 FFFF <br> \| <br> 0180 0000 | Color Memory 42 |
| 0140 3FFF <br> \| <br> 0140 0000 | Permanent Scratch Pad Memory 46 |
| 010F FFFF <br> \| <br> 0100 0000 | Temporary Scratch Pad Memory 38 |
| 001F FFFF <br> \| <br> 0000 0000 | Bit Map Memory 64 (Palette Map Memory 66) |

Fig. 4

DMA CONTROL REGISTER 222

| | |
|---|---|
| Bit 0 | Write Zero Data |
| Bit 1 | Write Non-Zero Data |
| Bit 2 | Write Constant on Zero Data |
| Bit 3 | Write Constant on Non-Zero Data |
| Bit 4 | Flip About Y-axis |
| Bit 5 | Flip About X-axis |
| Bits 6-14 | (unused) |
| Bit 15 | DMA GO Bit |

Fig. 5

SYSTEM CONTROL REGISTER 502

| | |
|---|---|
| Bit 0 | |
| Bit 1 | |
| Bit 2 | |
| Bit 3 | |
| Bit 4 | |
| Bit 5 | |
| Bits 6-7 | |
| Bits 8-15 | LED latch 110 |

Fig. 9

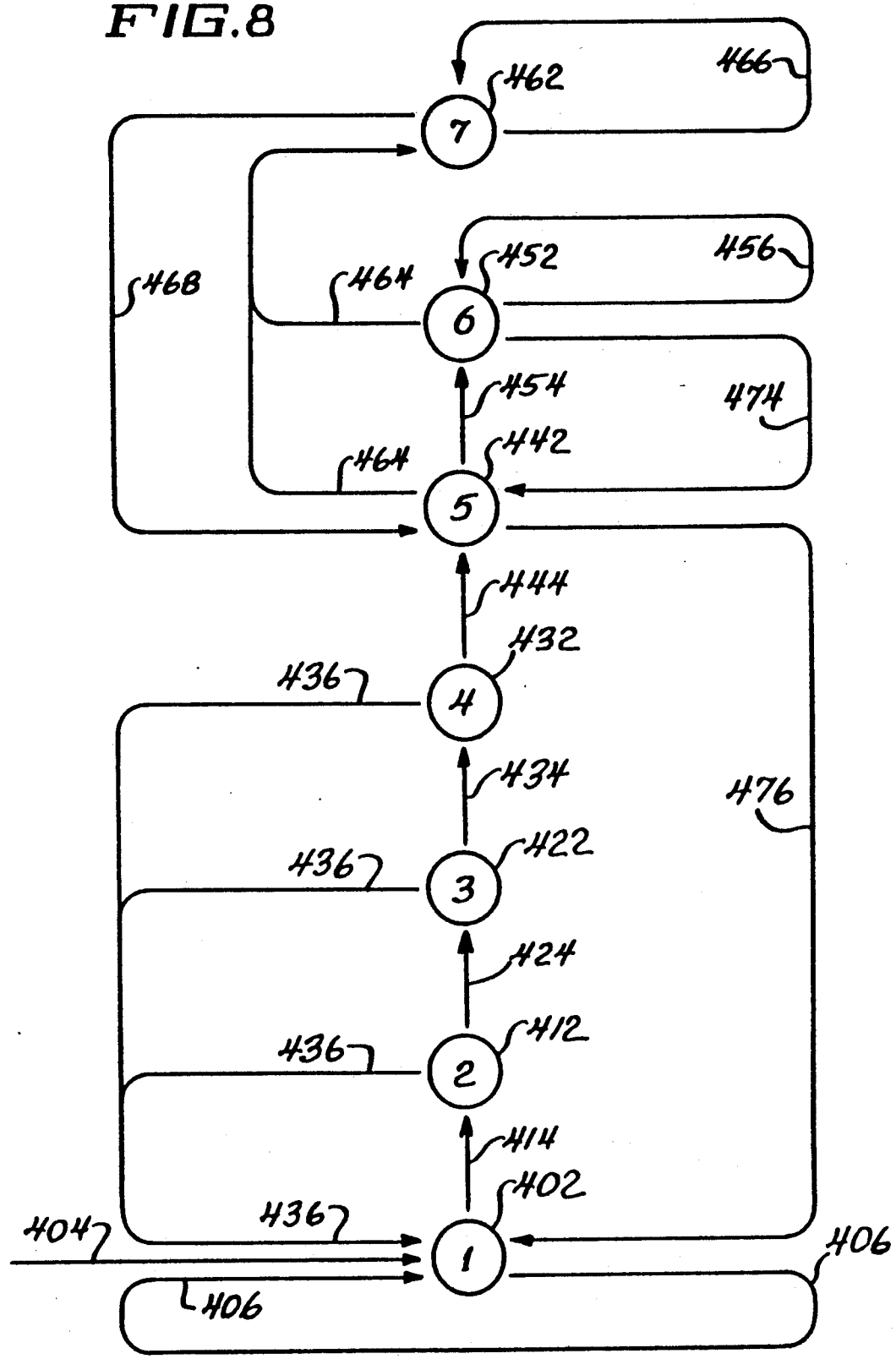

VIDEO DISPLAY CO-PROCESSOR FOR USE IN A VIDEO GAME

BACKGROUND OF THE INVENTION

1. Field of the Invention

The present invention relates generally to video displays and, more particularly, to video displays capable of real-time animation of video game scenes.

2. Description of the Prior Art

In addition to a color video display, video games include a digital computer, such as a microprocessor, whose operation generates the scene presented to one or more players on the color video display. The video game also includes one or more memories for digital data which contain the program executed by the digital computer and generally also image data. Execution of the program by the digital computer assembles the image data into a scene that then appears on the color video display. A player interacts to change the scene appearing on the video display through one or more controls such as push button switches a joystick, a track ball, a steering wheel, etc., also included in the video game. The video game signals from these various devices are supplied to the digital computer. In response to these signals, the digital computer alters the execution of its program and/or the selection and placement of image data within the scene. While there are several alternative techniques that may be employed for displaying a stored image on a color video display unit such as that included in a video game, at present the most widely used technique is called a bit map raster display.

A bit map raster display, is essentially what is done to display images on a conventional television screen. While not ordinarily visible to the human eye, the picture displayed on a television screen is made up of numerous, almost horizontal, parallel lines drawn across the screen's face beginning at the top of the screen and ending at its bottom. This arrangement of parallel lines is called a "raster." In standard television, the raster is made up of approximately 400 horizontal lines. Sixty times per second, an electronic circuit causes a beam of electrons to move from left to right along successive lines in this raster beginning at the top and ending at the bottom. The operation of this electron beam is called "scanning." As the electron beam moves along each line, another electronic circuit increases or decreases its intensity to brighten or darken a spot of light that the beam produces as it strikes the screen. Using this intensity modulation it is generally possible to resolve 512 or more individual locations along each such raster line as the electron beam scans its length.

To provide the signals required to display a scene on a television screen, a digital computer such as is used in a video game includes a digital data memory, generally referred to as a "bit map" memory or simply a "bit map," for storing scene data. To display a scene, this data is read from the bit map memory at the same rate as it is displayed on the television screen. Accordingly, the video game or similar device includes additional electronic circuits to synchronize the operation of the bit map memory and the scanning of the television screen, and to convert the digital data into signals suitable for changing the electron beam's intensity. Thus the operation of these additional electronic circuits uses the digital data retrieved from the bit map memory to present the viewer with the scene stored there.

In general, a scene to be viewed on a video display may be broken down into a background image plane such as the sky, a forest, a wall, etc. in front of which there is at least one foreground image plane. Each of these image planes may itself be further broken down into an array of picture elements generally referred to as "pixels".

In decomposing a scene into pixels for presentation on a video display, the pixels, which are generally all considered to be identically shaped rectangles, cover the entire area of the scene similar to tiles covering a floor. Further, throughout each pixel's area the scene has uniform color and color density. The area covered by an individual pixel depends upon the image's resolution. Thus, as a scene's resolution increases, the area covered by each pixel decreases while simultaneously the total number of pixels increases.

In general, the number of image planes making up a scene are greater than two. Thus, a scene will usually include a background image plane in front of which are several foreground image planes. In such a scene the planes are chosen so that no two of them intersect. This choice of image planes allows them to be ordered so each one is successively closer to the viewer. For example, a sky background image plane could lie behind a foreground image containing a cloud, and both the sky and the cloud image could lie behind a closer foreground image plane containing a character.

To properly reconstruct a scene that has been decomposed into a plurality of non-intersecting image planes, those planes are ordered so the background image plane is first, the image plane closest to the viewer is last, and the order of the intermediate image planes corresponds inversely with their distance from the viewer. After the image planes have been placed in the proper order, the composite scene may be assembled by superimposing successive image planes on top of each other. A set of transparent overlays illustrates this type of image reconstruction from an ordered set of image planes.

For a bit map raster scan video display, a set of digital data for the several image planes is employed. The digital data processing overwrites the data for a preceding plane image present in the bit map memory with the data for the next image plane closer to the viewer and so on for each image plane. Thus the composite scene produced by overwriting background image data present in a bit map memory with data for the foreground image plane next closer to the viewer is a new, composite scene which itself becomes the background image for all remaining images still closer to the viewer.

This technique has been recognized for some time. However, until now it has not been possible to use it in video displays, such as those used with video games and personal computers, for real-time display of scenes composed of several image planes. Real-time display of composite scenes was impossible because display processors used with the lower cost video displays have been unable to perform the digital data processing at the rates required for real-time television display.

For example, one earlier low cost display processor used in video games is capable of testing only one pixel of foreground data to determine if it is to be displayed. If a particular pixel of data is not to be displayed, this particular display processor employs a background generator circuit to display a pre-established, uniform background in that pixel. Thus, this display processor processes only a single plane of foreground data and displays a uniform background where there is no foreground data. Another prior video game display processor uses essentially the same technique but displays background image data read from a video disk.

SUMMARY OF THE INVENTION

An object of the present invention is to provide a video game that can present a real-time, animated display of a scene composed from images lying in a plurality of distinct image planes.

Another object of the present invention is to provide a co-processor for use in bit map raster scan video display systems that can, during a single raster scan time interval, assemble a scene by superimposing image data for several different images.

Another object of the present invention is to provide a co-processor for use in bit map raster scan video display systems that can simultaneously manipulate image data as it is being assembled into a scene.

In addition to the functional elements generally included in a bit map raster display, a video game in accordance with the present invention includes a Direct Memory Access ("DMA") co-processor that is especially adapted for processing many planes of image data during the time interval of a single television raster scan. Thus, the DMA of the present invention is organized to process image data so swiftly that during a single raster scan, the DMA co-processor can combine image data covering an area significantly greater than the area displayable on the video display unit. This rapid image processing permits superimposing many overlapping planes of image data. Furthermore, as the image data is being combined to produce a composite scene, the DMA co-processor can manipulate it to produce real-time animation. Accordingly, a video display system incorporating this DMA co-processor can provide real-time animation of a composite scene, such as that displayed on a video game, as that scene is assembled from different sets of image data.

To achieve this rapid processing speed, the DMA co-processor includes a Source Address Generation ("SAG") unit to generate the addresses of locations in an image memory from which image data is to be retrieved. Immediately upon retrieval, this image data is manipulated within a Data Pipe ("DP") unit also included in the DMA co-processor to provide smoothly moving images on the screen. Immediately after the image data has been manipulated, it is stored into address locations in a bit map memory that are specified by a Destination Address Generation ("DAG") unit also included in the DMA co-processor. The DMA co-processor also includes a Control Section ("CS") unit to receive supervisory image processing commands from the digital computer included in the video game and to control the operation of the SAG, DP and DAG units in accordance with those commands.

Game's digital computer preferably supervises the operation of the DMA co-processor so it processes a series of image data retrieved from the image memory in the order of their respective distances from the viewer. Because the DMA co-processor operates swiftly enough to combine a plurality of images whose data covers an area greater than that which can be displayed during a single raster scan time interval of the video display unit, the DMA co-processor can overwrite many successive planes of image data while it simultaneously manipulates such data to provide real-time animation of the scene appearing on the video display unit.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 3 is a block diagram depicting the CS functional unit included in the DMA co-processor illustrated in FIG. 1 that also depicts a state machine included in the CS functional unit;

FIG. 4 is a memory allocation table listing addresses for various addressable units included in the video game illustrated in FIG. 1 including a system control register for the video game illustrated in FIG. 1 and a DMA control register included in the DMA co-processor illustrated in FIG. 1;

FIG. 5 is a register table depicting individual bits in the control register included in the DMA co-processor illustrated in FIG. 4;

FIG. 8 is a state transition diagram for the state machine illustrated in FIG. 7; and FIG. 9 is a register table depicting individual bits in the video game system control register illustrated in FIG. 4.

DETAILED DESCRIPTION OF THE PREFERRED EMBODIMENT

Video Game System

Figure 1:
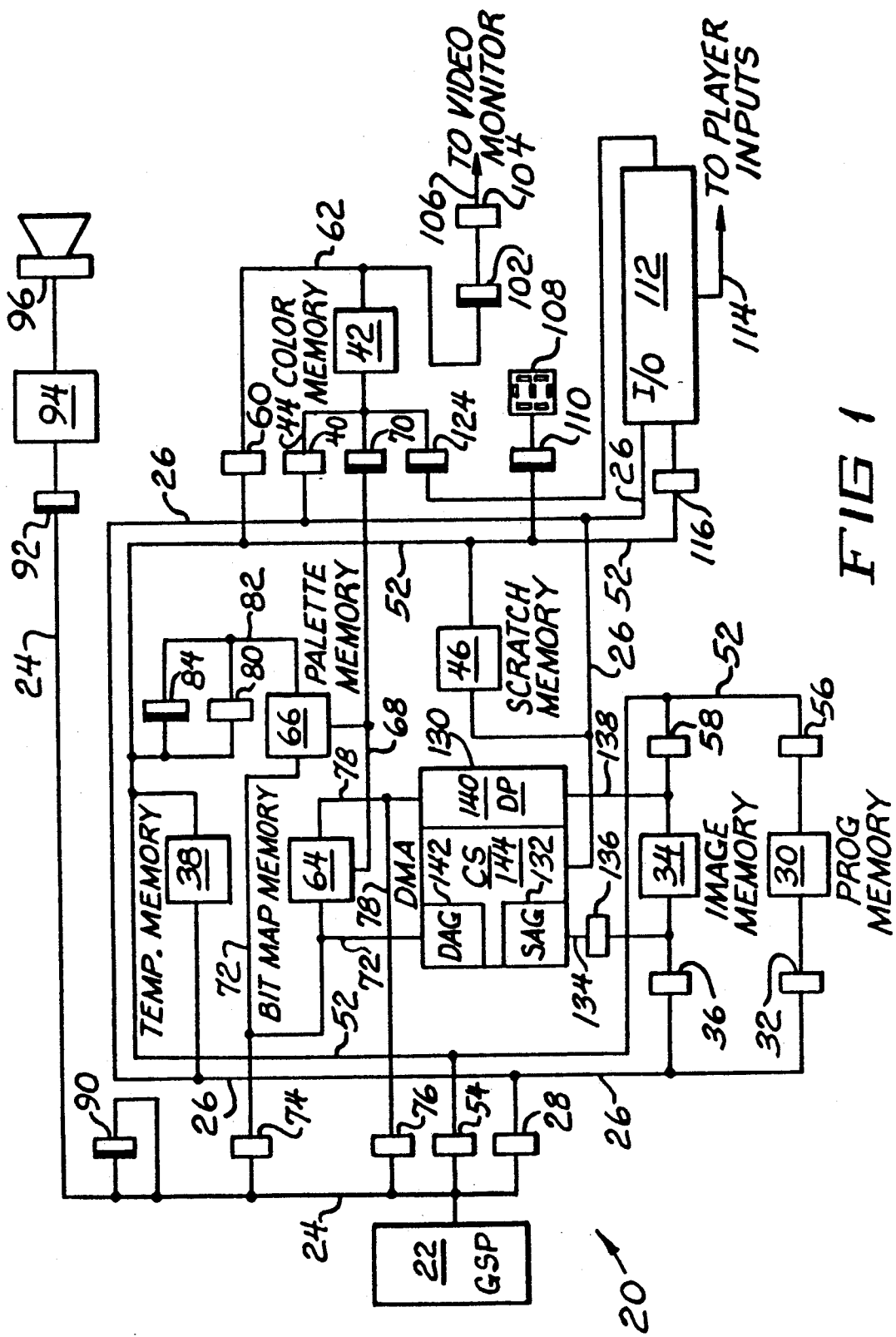
FIG. 1 is a block diagram depicting the address and data flow within a video game in accordance with the present invention that includes a video display DMA co-processor having a SAG functional unit, a DP functional unit, a DAG functional unit, and a CS functional unit.

FIG. 1 depicts a block diagram of a video game in accordance the present invention identified by the general reference character 20. The video game 20 includes a digital computer 22, preferably a Texas Instruments Graphics System Processor TMS34010 ("GSP"). The GSP, more completely described in Texas Instruments publication SPV002 issued January 1986 and revised March 1987, is a microprocessor optimized for graphics display systems. It includes a built-in instruction cache, the ability to simultaneously access memory and registers, and an instruction set designed specifically for raster graphics operation. The GSP is programmable to interface various different types of raster scan video displays. Accordingly, it generates horizontal sync, vertical sync and blanking signals that are required for operating a video display.

The digital computer 22 addresses all functional units in the video game 20 through a 16 binary digit ("bit"), 2 byte, wide local address/data bus 24. In the preferred embodiment of the digital computer 22, the interface of the GSP to the bus 24 is triple-multiplexed for transmitting Row Addresses and Column Addresses data, and for receiving program instructions or for transmitting and receiving data. Since internally within the GSP instructions generate bit addresses, the GSP places only the fourth and higher address bits on the local address/data bus 24 during its combined RAS and CAS cycles.

In the video game 20, a 2 byte wide local address bus 26 receives addresses present on the local address/data bus 24 through a unidirectional buffer 28. Via the local address bus 26, the digital computer 22 is able to address various memories and functional units included in the video game 20. Accordingly, over the bus 26 the digital computer 22 addresses a program memory 30 through a unidirectional buffer 32. Similarly, the digital computer 22 addresses an image memory 34 through a unidirectional buffer 36. Likewise, the digital computer 22 directly addresses a temporary scratch pad memory 38 over the local address bus 26. Through a unidirectional buffer 40, the bus 26 transmits the low order 15 bits of addresses from the digital computer 22 to a color memory 42 via a 15 bit wide color address bus 44. Similarly, the digital computer 22 also directly addresses a permanent scratch pad memory 46 over the local address bus 26. The following table summarizes the characteristics and organizations of the various memories addressed by the digital computer 22 through the local address bus 26.

| MEMORY | SIZE | TYPE |
| --- | --- | --- |
| Program Memory 30 | 512K × 16 | Static ROM |
| Image Memory 34 | 1,024K × 32 | Static ROM |
| Temporary Scratch Pad Memory 38 | 64K × 16 | Dynamic RAM |
| Color Memory 42 | 32K × 16 | Static RAM |
| Permanent Scratch Pad Memory 46 | 2K × 8 | Battery Backed CMOS Static RAM |

To properly interface the static type memories 30, 34 and 42, the unidirectional buffers 32, 36 and 40 respectively concatenate the RAS and the CAS addresses, as those addresses are sequentially transmitted from the preferred type of digital computer 22, to obtain the single address needed for accessing these static memories.

The preceding memories 30, 34, 38, 42, and 46 send data to or receive data from the digital computer 22 over a 2 byte wide local data bus 52. All such data comes to the digital computer 22 or leaves it through a bidirectional 2 byte wide buffer 54 located between the local address/data bus 24 and the local data bus 52. In a similar manner, the program memory 30, the image memory 34, and the color memory 42 send data to or receives data from the local data bus 52 respectively through bidirectional buffers 56, 58, and 60.

The program memory 30 contains the computer program executed by the digital computer 22 together with some of the data needed for that program's execution. The image memory 34 contains data specifying images that are displayable on the video game 20. Each different image is stored in a contiguous area of memory with one byte of data being stored per image pixel. The digital computer 22 stores intermediate results in and retrieves them from the temporary scratch pad memory 38. During normal operation of the video game 20, the color memory 42 contains a look up table for converting image data into color data that specifies colors to be displayed. Image data, applied as an address to the color memory 42, retrieves color data from address locations specified by the image data and causes the retrieved data to be placed on a 2 byte wide color data bus 62. During initialization of the video game 20, the digital computer 22 stores this color data into the color memory 42 via the buffer 60. The permanent scratch pad memory 46 contains data stored there when the video game 20 is built that is used by the digital computer 22 in initializing the video game 20. The digital computer 22 also maintains certain types of bookkeeping information in the permanent scratch pad memory 46.

In addition to addressing the memories 30, 34, 38, 42 and 46 described above, the digital computer 22 also addresses a bit map memory 64 and a palette map memory 66. Both of the memories 64 and 66 are assembled from Video RAM ("VRAM") integrated circuit chips, preferably the Texas Instrument type 4461, that can be operated in a page addressing mode. VRAM integrated circuit chips are dual ported, dynamic RAM type memory chips. One port of a VRAM is a random access port used for writing image data into the memory. The other port of a VRAM is a serial port used for reading image data serially from the memory. In page addressing mode, a single RAS is applied to these VRAMs followed by a sequence of CASes, each one of which stores data into both the bit map memory 64 and the palette map memory 66 which operate in parallel. The following table summarizes the characteristics and organizations of the bit map memory 64 and the palette map memory 66.

| MEMORY | SIZE | TYPE |
| --- | --- | --- |
| Bit Map Memory 64 | 64K × 32 | Dynamic VRAM |
| Palette Map Memory 66 | 64K × 32 | Dynamic VRAM |

The bit map memory 64 and the palette map memory 66 respectively store one byte of data for each pixel in the scene appearing on the video game 20. The memories 64 and 66 are organized so each serial reading operation supplies 512 bytes of serial data from both the bit map memory 64 and the palette map memory 66 to a 2 byte wide serial video data bus 68 during the scanning time interval of a single video raster scan line. As each pixel is displayed, one byte of data from the bit map memory 64 is juxtaposed with one byte of data from the palette map memory 66 to produce a composite 2 byte address on a serial video data bus 68. The low order 15 bits of these 2 bytes of data are applied to the color address bus 44 through a unidirectional latch 70.

To address the bit map memory 64 and the palette map memory 66, the digital computer 22 first transmits 1 byte RAS to a 1 byte wide video address bus 72 through a 1 byte unidirectional buffer 74. Then, because the VRAM chips in the memories 64 and 66 operate in page mode as described above, the digital computer 22 transmits one or more CASes to the memories 64 and 66 also through the buffer 74 to store or retrieve an equal number of 4 byte data words.

In response to address signals on the video address bus 72, data is exchanged between the digital computer 22 and the bit map memory 64 through a bidirectional buffer 76 located between the local address/data bus 24 and a 4 byte wide parallel video data bus 78. In response to these same address signals, data is exchanged via the local data bus 26 between the digital computer 22 and the palette map memory 66 operating in one of two different ways. In the first way, 2 bytes of data passes through a bidirectional 2 byte buffer 80 between the local data bus 26 and a 2 byte wide palette data bus 82 for each operation of the palette map memory 66.

In the second way, the digital computer 22 stores 2 bytes of data in a palette latch 84 which retains that data until it is subsequently changed by the digital computer 22. In this second mode of operation, the palette latch 84 supplies its data to the palette data bus 82 so each successive storage operation stores the same identical data at the addressed locations in the palette map memory 66. Thus, in this second mode of operation, while the data held in the palette latch 84 remains unchanged, successive addresses on the video address bus 72 cause storage of the same identical image data into a plurality of memory locations in the palette map memory 66 in parallel with the storage of image data into the corresponding address locations in the bit map memory 64. While the palette map memory 66 receives only 2 bytes of data from the buffer 80 or the palette latch 84 for each address supplied on the video address bus 72, internally within the palette map memory 66 these 2 bytes of data are expanded into the full 4 byte data width of each address in the palette map memory 66.

The video game 20 also includes a 1 byte wide auto erase address latch 90 whose input and output are both connected to the local address/data bus 24. The auto erase address latch allows erasing the scene stored in the bit map memory 64 line by line as the image is scanned from the memory 64. To provide this function, the bit map memory 64 includes a reserved row of data for an entire video raster scan line. This reserved row of data is invisible to a player of the video game 20 because its location in the bit map memory 64 causes it to be displayed below the bottom of the screen. Generally, this reserved row of data will be filled with zeros during initialization of the video game 20 and never changed thereafter. In displaying a scene on the video game 20, immediately prior to the display of each video raster scan line of image data the digital computer 22 provides an address specifying a row of image data in the bit map memory 64. During auto erase operation, each row address provided by the digital computer 22 is latched into the auto erase address latch 90. During retrace, immediately after each scan line of image data is transferred from the bit map memory 64 over the serial video data bus 68:

1. instruction execution by the digital computer 22 is automatically halted;
2. the reserved row of data is automatically loaded into a register included internally within the VRAMs of the bit map memory 64;
3. the data in the internal VRAM register is stored into the row of the bit map memory 64 and the palette map memory 66 at the address contained in the auto erase address latch 90;
4. the digital computer 22 is released to resume its normal program execution; and
5. the address of the next row of image data is stored into the auto erase address latch 90 in preparation for automatically erasing that scan line upon completion of that video raster scan line's display.

Also connected to the local address/data bus 24 is a 12 bit sound port latch 92. Periodically, the digital computer 22 transfers the low order 12 bits of data on the bus 24 into the sound port latch 92. Data stored in the sound port latch 92 is applied through a sound generator 94 to a speaker 96. Thus a pattern of data stored successively into the sound port latch 92 is audibly perceived by a player of the video game 20.

The low order 15 bits of 2 byte color data, placed on the color data bus 62 by the color memory 42 in response to image data applied as addresses to the color memory 42, is applied through a 15 bit wide color latch 102 to a Red Green Blue ("RGB") color signal generation circuit 104. Within the color signal generation circuit 104, these 15 bits of color data are applied respectively as input signals to 3 Digital to Analog Converters ("DACs") as 3 groups of 5 bits each. These 3 DACs produce 3 output signals transmitted from the color signal generation circuit 104 over a 3 wire RGB output bus 106. The signals on the RGB output bus 106 are applied in a conventional manner as RGB input signals to a color video monitor, not show in FIG. 1.

The video game 20 includes a seven segment diagnostic Light Emitting Diode ("LED") array 108 by which the computer 22 may present diagnostic and status codes to a service-person. The digital computer 22 transmits such diagnostic data to the LED 108 through a unidirectional 1 byte LED latch 110.

The digital computer 22 addresses an Input/Output ("I/O") functional unit 112 over the local address bus 26. The I/O functional unit 112 includes a port 114 through which interaction controls such as push button switches, and/or a joystick, a track ball, a steering wheel, a coin door, etc. (not shown in FIG. 1) connect to the remainder of the video game 20. The digital computer 22 reads data from and/or sends data to such devices attached to the I/O functional unit 112 through a bidirectional buffer 116.

For certain particular types of games to be played on the video game 20, the I/O functional unit 112 may also include an electronic circuit for generating a background image or the image of a road independently from image generation by the bit map memory 64. In the instances of such games, this background/road image generation capability is included in the I/O functional unit 112 to allow the circuit to communicate directly with a joystick, track ball, steering wheel, etc. at whatever data transmission rate their operation requires. If the I/O functional unit 112 includes such a background/road image generation capability, then the low order 15 bits of such image data is transmitted to the color memory 42 via a 2 byte wide background-/road data bus 122, a latch 124, and the 15 bit wide color address bus 44.

Because the combined bit map memory 64 and palette map memory 66 are capable of supplying data to the color memory 42 through the latch 70 at the same time the I/O functional unit 112 is generating and supplying a background/road image to the color memory 42 the video game 20 also includes a priority scheme to select between these two competing sources of addresses for the color memory 42. This priority scheme operates in two complementary modes. In the first mode, if a pixel of data on the serial video data bus 68 is different from zero, then that data is used for addressing the color memory 42. However, if in this first mode the pixel on the serial video data bus 68 equals zero, then the data on the background/road data bus 122 is used for addressing the color memory 42. In the second mode, if a pixel of data on the bus 122 is different from zero, then that data is used for addressing the color memory 42. However, if in this second mode the pixel on the bus 122 equals zero, then the data on the serial video data bus 68 is used for addressing the color memory 42. Thus, in the first mode of operation the data on the serial video data bus 68 has priority over and therefore overwrites the data on the background/road data bus 122. Conversely, in the second mode of operation the data on the background/road data bus 122 has priority over and therefore overwrites the data on the video data bus 68.

FIG. 1 and the preceding discussion deal primarily with only the address and data flow within the video game 20. In addition to the address and data flow paths within the video game 20 such as the busses 24, 26, 52, 62, 68, 72, 78 and 82, the video game 20 also includes numerous control signal lines that the digital computer 22 employs to control and coordinate the operation of various functional units in the video game 20 including the various buffers 28, 32, 36, 40, 54, 56, 58, 60, 74, 76, 80 and 116, the latches 70, 84, 90, 92, 102, 110, and 124, the memories 30, 34, 38, 42, 46, 64 and 66, and the I/O functional unit 112. The details of these control signal lines and of the signals transmitted over them, which one of ordinary skill can easily determine from the information provided in the various figures and in the text contained herein describing them, have been omitted for sake of clarity and to increase the understandability of the figures and their accompanying description.

The video game 20 as described thus far, when properly programmed, is fully capable of performing all the display, animation, auditory, and interactive functions required of any video game. The capability of this video game 20 extends even to creating a composite scene by overlaying successive planes of image data that are read from the image memory 34, manipulated in the digital computer 22, and then stored into the bit mp memory 64. However, as described thus far, the video game 20 is incapable of composing scenes by overlaying successive planes of image data at sufficiently rapid rate to provide real-time animation. Accordingly, to allow real-time animation of composite scenes, the video game 20 also includes a video display Direct Memory Access ("DMA") co-processor 130 that is connected to the local address bus 26 as illustrated in FIG. 1.

The DMA Co-Processor 130

The DMA co-processor 130 includes a Source Address Generation ("SAG") functional unit 132 for generating 3 byte addresses of locations in the image memory 34. Addresses are transmitted from the SAG 132 over a 3 byte wide source address bus 134 and through a 3 byte wide tri-state buffer 136 to the image memory 34. The buffer 136 is required to drive the load of the address lines for the 4 megabytes of static ROM memory making up the image memory 34. In response to each address received by the image memory 34, it immediately transmits 4 bytes of image data back over an image data bus 138 to a Data Pipe ("DP") functional unit 140 included in the DMA co-processor 130. This image data is manipulated within the DP 140 to produce images that visually appear to move smoothly across the screen. After the image data has been manipulated in the DP 140, up to 4 bytes are selectively placed on the parallel video data bus 78. The manipulated image data on the bus 78 is then selectively stored into address locations in the bit map memory 64 that are generated by a Destination Address Generation ("DAG") functional unit 142 also included in the DMA co-processor 130. The DMA co-processor 130 also includes a Control Section ("CS") functional unit 144 to receive supervisory image processing commands from the digital computer 22 and to control the operation of the SAG 132, the DP 140 and the DAG 142 in accordance with those commands. Thus, in response to such commands the DMA co-processor 130 operates as a semi-independent co-processor to the digital computer 22.

As described in greater detail below, when driven at a 24 MHz clock frequency the DMA co-processor 130 in accordance with the present invention processes image data so swiftly that it can manipulate multiple planes of image data covering an addressable area greater than twice that of a video display unit during a single raster scanning time interval. That is, the DMA co-processor 130 in accordance with the present invention can process more than 800 times 512 bytes of image data, i.e. more than 409,600 bytes of image data, in 1/60th of a second.

The Data Pipe Functional Unit 140

Figure 2:
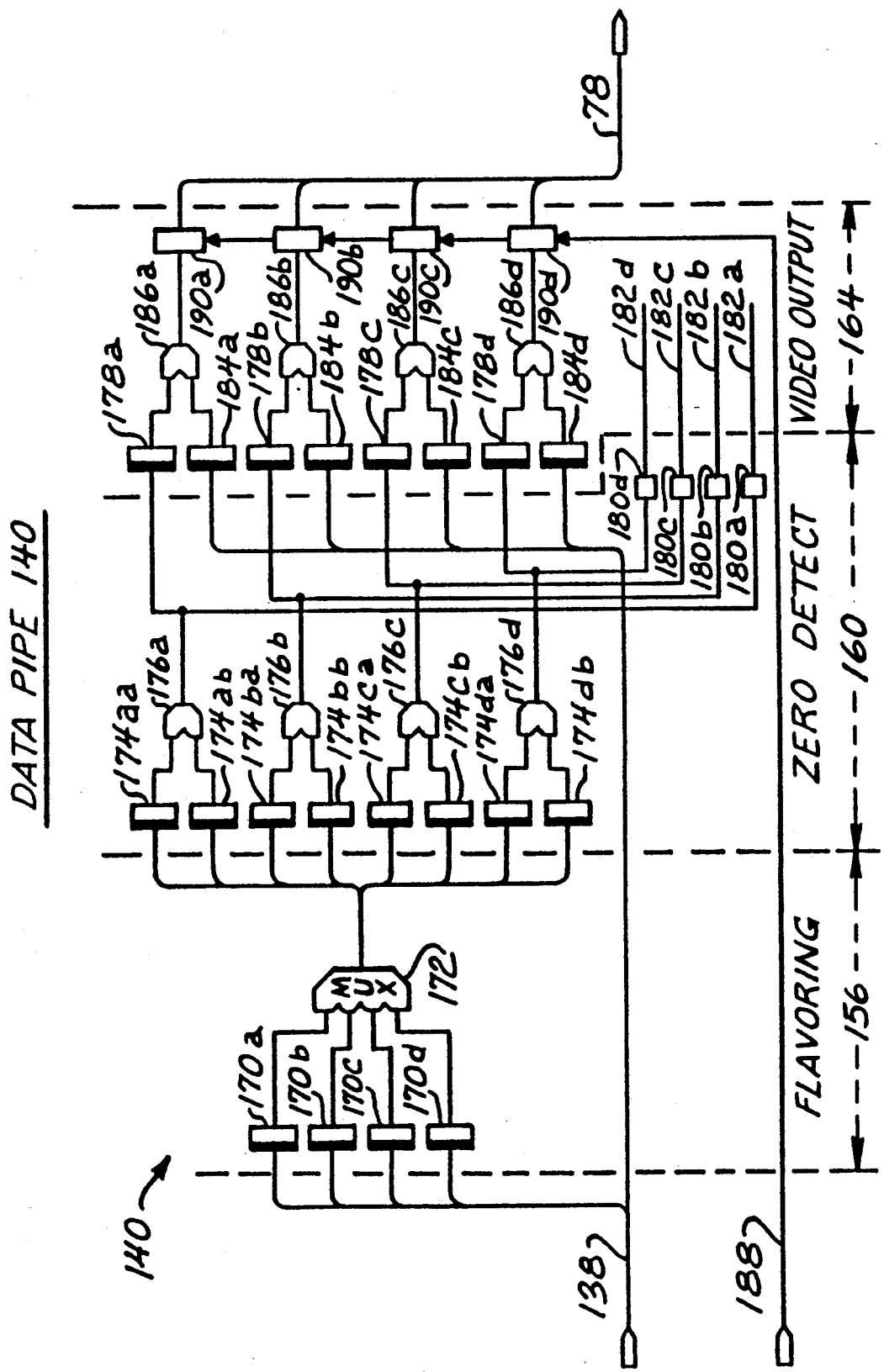
FIG. 2 is a block diagram depicting the DP functional unit included in the DMA co-processor illustrated in FIG. 1.

FIG. 2 is a block diagram depicting the DP 140 included in the DMA co-processor 130. The DP 140 is a 3 stage pipeline processor. The first section of the pipeline is a time multiplex "flavoring" section 156. The second section of the pipeline is a zero detection section 160. The third section of the pipeline is a video output section 164. The three pipeline sections 156, 160, and 164 process image data concurrently as it moves through the DP 140. Accordingly, image data takes 3 cycles of the DMA co-processor 130 to pass through the DP 140 from its input at the image data bus 138 to its output at the parallel video data bus 78.

During each cycle of the DMA co-processor 130, the time multiplex flavoring section 156 receives 4 bytes from the image memory 34 from four immediately adjacent pixels in a horizontal row of image data. One byte of this image data is latched respectively into each of four 1 byte wide input latches 170a–d. All 4 bytes of image data in the input latches 170a–d are then sequentially transferred, 1 byte at a time, through a 4-to-1, 1 byte wide multiplexer 172 during a single cycle of the DMA co-processor 130.

The multiplexer 172 is the only circuit in the image data processing portion of the DMA co-processor 130 that operates at the full 24 MHz clock frequency supplied to the DMA co-processor 130. All other image data processing operations are performed at one-fourth of the 24 MHz clock frequency, i.e. at 6 MHz, because the remainder of the image data processing path through the DMA co-processor 130 is 4 bytes wide in comparison with the 1 byte width of the multiplexer 172. Accordingly, the frequency at which the DMA co-processor retrieves image data from the image memory 34 and the frequency at which it stores manipulated image data into the bit map memory 64 are both 6 MHz.

The input to the zero detection section 160 of the DP 140 consists of 4 pairs of 1 byte wide input latches 174aa–db. As each byte of image data leaves the multiplexer 172 it is respectively latched into one of the input latches 174aa–db. The particular latch in the pairs of latches 174aa–db that receives a particular byte of image data from the flavoring section 156 depends upon that pixel's location along the horizontal row in the image data received from the image memory 34 and its desired storage location along the video raster scan line to be stored into the bit map memory 64.

The zero detection section 160 of the DP 140 also includes four 2-to-1, 1 byte wide multiplexers 176a–d. The multiplexers 176a–d respectively select one of the two bytes of image data in the corresponding pair of latches 174aa–ab through 174da–db for transmission to a corresponding input latch 178a–d in the video output section 164 of the DP 140. The particular latch 174 from which a byte of image data is transferred into latch 178 also depends upon that pixel's location along the horizontal row in the image data received from the image memory 34 and its desired storage location along the video raster scan line to be stored into the bit map memory 64.

To illustrate the operation of the DP 140 as described thus far, the following table summarizes the processing of 16 pixels of contiguous image data from their entry into the input latches 170a–d, their progress through the latches 174aa–db, and their storage in the input latches 178a–b during four consecutive cycles of the DMA co-processor 130. In this example, the four pixels of image data entering the DP 140 concurrently from the image data bus 138 leave the DP 140 concurrently 3 DMA co-processor cycles later as 4 contiguous bytes of image data.

|  | Sections of the DP 140 | | |
|---|---|---|---|
|  | 156 | 160 | 164 |
|  | 170a-d | 174aa-da | 174ab-db | 178a-d |
| Cycle 1 | pixel 1 | | | |
|  | pixel 2 | | | |
|  | pixel 3 | | | |
|  | pixel 4 | | | |
| Cycle 2 | pixel 5 | pixel 1 | | |
|  | pixel 6 | pixel 2 | | |
|  | pixel 7 | pixel 3 | | |
|  | pixel 8 | pixel 4 | | |
| Cycle 3 | pixel 9 | | pixel 5 | pixel 1 |
|  | pixel 10 | | pixel 6 | pixel 2 |
|  | pixel 11 | | pixel 7 | pixel 3 |
|  | pixel 12 | | pixel 8 | pixel 4 |
| Cycle 4 | pixel 13 | pixel 9 | | pixel 5 |
|  | pixel 14 | pixel 10 | | pixel 6 |
|  | pixel 15 | pixel 11 | | pixel 7 |
|  | pixel 16 | pixel 12 | | pixel 8 |

The following table exemplifies an alternative operation of the DP 140 in which 16 pixels of data enter the input latches 170a–d to pass through the latches 174aa–db to the latches 178a–d while being shifted 2 bytes to the right along the video raster scan line.

|  | Sections of the DP 140 | | |
|---|---|---|---|
|  | 156 | 160 | 164 |
|  | 170a-d | 174aa-da | 174ab-db | 178a-d |
| Cycle 1 | pixel 1 | | | |
|  | pixel 2 | | | |
|  | pixel 3 | | | |
|  | pixel 4 | | | |
| Cycle 2 | pixel 5 | | pixel 3 | |
|  | pixel 6 | | pixel 4 | |
|  | pixel 7 | pixel 1 | | |
|  | pixel 8 | pixel 2 | | |
| Cycle 3 | pixel 9 | pixel 7 | pixel 3 | |
|  | pixel 10 | pixel 8 | pixel 4 | |
|  | pixel 11 | | pixel 5 | pixel 1 |
|  | pixel 12 | | pixel 6 | pixel 2 |
| Cycle 4 | pixel 13 | pixel 7 | pixel 11 | pixel 3 |
|  | pixel 14 | pixel 8 | pixel 12 | pixel 4 |
|  | pixel 15 | pixel 9 | | pixel 5 |
|  | pixel 16 | pixel 10 | | pixel 6 |

In this second example, during each cycle of the DMA co-processor 130 the multiplexer 172 directs the first two bytes of image data from the latches 170a–b into the latches 174ca–da while alternating back and fourth between the latches 174ca–da and 174cb–db every cycle. During each cycle the multiplexer 172 also directs the last two bytes of image data from the latches 170c–d into the latches 174ab–bb while alternating back and fourth between the latches 174ab–ab and 174cb–db every cycle out of phase with the alternation of the first two bytes of image data. Except for the initial and final cycles in processing each horizontal row of image data, during every cycle of the DMA co-processor 130 the multiplexers 176a–d select the proper data from four of the eight latches 174aa–db to assemble the next four contiguous bytes of image data in the latches 178a–d. During the initial and final cycles in processing each horizontal row of image data, the multiplexers 176a–d select data from only the latches 174aa–db that contain valid bytes of image data.

From the preceding examples and description, it is apparent that the time multiplex flavoring section 156, the zero detection section 160 and the input latches 178a–d of the DP 140 can be controlled to operate cooperatively for transmitting image data directly through the DP 140 as shown in the first example, or for transmitting such data shifted laterally along the video raster scan line by 1, 2 or 3 pixels either to the right or to the left as illustrated in the second example. Furthermore, shifting image data left or right only increases by one the number of cycles of the DMA co-processor 130 required to process each horizontal row of image data. This shifting of image data to the right or the left permits smooth motion of images as they move horizontally across the display during successive raster scans. As will be explained in greater detail below, coordinated operation of the DP 140 in conjunction with the SAG 132 and the DAG 142 permits image flipping about both horizontal and vertical axes and also image clipping.

Each byte of image data being selected by the multiplexers 176a–d in the zero detection section 160 in addition to being latched into the input latches 178a–b of the video output section 164, is also applied to the input of one of four zero detectors 180a–d. The output signals from the zero detectors 180a–d are transmitted over zero detect signal lines 182a–d to the CS 144 for use by the DMA co-processor 130 in controlling the operation of the DP 140.

In addition to the input latches 178a–d, the video output section 164 includes a four byte wide DMA constant register which consists of four 1 byte wide DMA constant latches 184a–d. The DMA constant register holds image data stored there from the image data bus 138. Referring back to FIG. 1, the digital computer 22 stores image data into the DMA constant register by placing the appropriate address on the local address bus 26 while simultaneously placing the constant image data on the image data bus 138 via a path made up of the local address/data bus 24, the bidirectional buffer 54, the local data bus 52 and the bidirectional buffer 58.

Referring once again to FIG. 2, image data present in the constant latches 184a–d remains stored there throughout the processing of an image by the DMA co-processor 130. Accordingly, such image data is constantly available for selection respectively by four 2-to-1, 1 byte wide multiplexers 186a–d. The digital computer 22 can command the DMA co-processor 130 to control the operation of the multiplexers 186a–d based upon the state of the signals present on the zero detect signal lines 182a–d. Thus, the DMA co-processor 130 can individually control the operation of the multiplexers 186a–d to select between image data present in each of the input latches 178a–d or in the constant latches 184a–d depending upon the outcome of the test performed on each byte of image data held in the individual input latches 178a–d.

The ability to detect whether individual pixels of image data retrieved from the image memory 34 contain zero or non-zero data can be used by the computer program to provide a shadow for an image, to provide a background image, or to erase an image. For example, in shadowing an image, if the data for any pixel present in any of the input latches 178a–d is zero, the image data present in the corresponding constant latch 184a–d can be substituted for such pixel's zero data. Conversely, image erase may be performed easily by substituting the pixel data in the constant latch 184a–d for all pixels having non-zero image data in the corresponding input latch 178a–d.

After the multiplexers 186a–d have selected a byte of image data from the input latches 178a–d or from the constant latches 184a–d, those four bytes are ready for transmission over the parallel video data bus 78 for storage in the bit map memory 64. Accordingly, a signal present on a video enable signal line 188 causes four tri-state buffers 190a–d to transmit the output signals from the multiplexers 186a–d to the parallel video data bus 78.

Control Section Functional Unit 144

The CS 144 of the DMA co-processor 130, depicted in FIG. 3, includes a CPU interface circuit 202 that receives commands from the digital computer 22 for controlling the operation of the DMA co-processor 130. Accordingly, the CPU interface 202 receives a chip select signal from the digital computer 22 over a chip select signal line 204 for enabling the DMA co-processor 130 to receive command data from or send status data to the digital computer 22. These data transfers between the digital computer 22 and the CPU interface 202 occur over the image data bus 138. Signals on a CPU read signal line 206 and a CPU write signal line 208 determine whether status data will be sent from the DMA co-processor 130 or whether the DMA co-processor 130 will receive command data from the digital computer 22. The location within the DMA co-processor 130 from which status data is read or to which command data is written is specified by address signals transmitted to the CPU interface 202 over the local address bus 26. The CPU interface 202 can also transmit an interrupt signal to the digital computer 22 over a CPU interrupt request signal line 212. Finally, the digital computer 22 can reset the operation of the DMA co-processor 130 by transmitting a reset signal to the CPU interface 202 and to a clock generator circuit 214, also included in the CS 144, over a reset signal line 216.

FIG. 4 is a memory allocation table showing memory addresses for various units included in the video game 20 that may be addressed by the digital computer 22. Accordingly, among the items depicted in that figure are various 2 byte wide registers included in the DMA co-processor 130 that are addressable through the CPU interface 202 of the CS 144. As illustrated in FIG. 4, through the CPU interface 202 the digital computer 22 can address the DMA constant latches 184a–d, a DMA control register 222, a DMA source address offset register 224 (FIG. 7), a DMA least significant word ("LSW") source address register 226a, a DMA most significant word ("MSW") source address register 226b, a DMA X-coordinate destination address register 230, a DMA Y-coordinate destination address register 232, a DMA horizontal size register 234, and a DMA vertical size register 236. The operation of the registers 224 through 236 are described more thoroughly below in connection with the descriptions of the SAG 132 and the DAG 142.

Referring to FIG. 5, the DMA control register 222 depicted there contains 2 bytes, 16 bits, only 7 of which are actually used for controlling the operation of the DMA co-processor 130. By appropriately setting either bit 0 or bit 1 in the DMA control register 222, the digital computer 22 can command the DMA co-processor 130 to write zero or non-zero image data into specified address locations in the bit map memory 64. Similarly, by appropriately setting either bit 2 or bit 3 in the DMA control register 222, the digital computer 22 can command the DMA co-processor 130 to select individual bytes of data from the DMA constant register 184 for storage in the bit map memory 64 depending upon whether the image data in the corresponding input latch 178a–d is zero or not. Lastly, by appropriate setting either bit 4 or bit 5 in the DMA control register 222, the digital computer 22 can command the DMA co-processor 130 to transpose an image read from the image memory 34 about a vertical line of symmetry, a horizontal line of symmetry, or both. Such transpositions of image data produce a mirroring of the image as displayed on the video game 20.

With bits 0 through 5 of the DMA control register 222 appropriately set and with other parameters of the image data manipulation to be described in greater detail below appropriately selected, the digital computer 22 commands the DMA co-processor 130 to manipulate image data by appropriately setting bit 15 in the DMA control register 222. The DMA co-processor 130 is commanded to manipulate an image data merely by storing an appropriately prepared 2 bytes of command data into the DMA control register 222 in a single storage operation.

Returning to FIG. 3, in response to (a) the control signals which the CPU interface 202 receives, (b) the address present on the local address bus 26, and (c) the values of the various bits 0–5 in the DMA control register 222, the CPU interface 202 produces a plurality of control signals for various functional units included in the DMA co-processor 130. These control signals are transmitted to the functional units over a plurality of signal lines in a register decode signal bus 238 (FIG. 3).

Having received control signals from the CPU interface 202, the functional units in the DMA co-processor 130 process image data at a rate established by the clock generator circuit 214. The clock generator 214 receives a 24 MHz clock signal over a DMA master clock signal line 242. The clock generator 214 uses this 24 MHz clock signal to generate a plurality of clock signals needed to synchronize and coordinate the overall operation of the DMA co-processor 130. The clock generator 214 transmits those clock signals to its various functional units over a plurality of clock lines 244.

The CS 144 also includes a state machine 250 which has 7 distinct operating states described in greater detail below. The state machine 250 receives a clock signal from the clock generator 214 via signal line 252. In addition it receives: (a) a reset signal over the reset line 216, (b) output signals from the zero detectors 180a–d via lines 182a–d, (c) an end of horizontal row signal from the SAG 132 via signal line 254, and (d) an end of horizontal row signal from the DAG 142 via line 256, (e) a DAG end of object signal via signal line 258 and (f)

control signals from bits 0-5 of the DMA control register 222 via a 6 bit wide mode control bus 260.

A DMA run control circuit 262 included in the CS 144 receives a DMA GO control signal from bit 15 of the DMA control register 222 via signal line 264. The DMA run control circuit 262 also receives a DAG end of object signal from the DAG 142 via line 258 together with a DMA halt request signal from the digital computer 22 via a DMA halt request signal line 268. In response to these three input signals, the DMA run control circuit 262 produces a DMA GO control signal which is transmitted together with the DMA halt request signal from the DMA run control circuit 262 to the state machine 250 via a 2 bit wide state machine run control bus 272. The DMA run control circuit 262 also produces a DMA halt acknowledge signal that is transmitted from the DMA co-processor 130 over a DMA halt acknowledge signal line 274.

In response to its various input signals, the state machine 250 produces various output signals for controlling the operation of both the various functional units in the DMA co-processor 130 as well as the operation of the bit map memory 64 and the palette map memory 66. Thus the state machine 250 produces four video output multiplexer select signals that are transmitted over a 4 bit wide video output multiplexer select signal bus 278 to each of the multiplexers 186a-d in the video output section 164 of the DP 140. The individual signals on the video output multiplexer select signal bus 278 control whether the multiplexers 186a-d select image data from their input latches 178a-d or their constant latches 184a-d.

The state machine 250 also produces signals that are transmitted over a SAG multiplexer control signal bus 280 for controlling the operation of multiplexers located in the SAG 132. Similarly, the state machine 250 produces signals that are transmitted over a DAG multiplexer control signal bus 282 for controlling the operation of multiplexers located in the AG 142. In addition to the video output multiplexer select signals supplied to the multiplexers 186a-d, the state machine 250 also produces other multiplexer control signals that are transmitted over a DP multiplexer control signal bus 284 to the multiplexers 172 and 176a-d included in the time multiplex flavoring section 156 and the zero detection section 160 of the DP 140. To specify the amount of image data shifting to be performed by the combined operation of the multiplexers 172 and 176a-d, the low order 2 bits of the bit X-Coordinate destination address register 230 are supplied to the state machine 250 via a 2 bit wide shift count signal bus 286.

To control the operation of the bit map memory 64 and the palette map memory 66, the state machine 250 produces four video write control signals, one signal respectively for each byte of image data to be stored into the bit map memory 64 during a single memory cycle. The state machine 250 transmits these video write control signals to the memories 64 and 66 via video write control signal lines 292a-d. The video write control signals control the operation of the memories 64 and 66 for selectively storing or not storing the individual bytes of each 4 byte image data word placed on the parallel video data bus 78 by the DP 140 during operating cycles of the DMA co-processor 130. The state machine 250 also produces RAS and CAS signals that are transmitted to the bit map memory 64 and the palette map memory 66 over a video RAS signal line 294 and a video CAS signal line 296. These RAS and CAS signals control the storage of image data into the VRAMs included in the memories 64 and 66. A tri-state buffer 298 controls transmission of the video write control signals and the RAS and CAS control signals from the state machine 250 to the memories 64 and 66 via the signal lines 292a-d, 294 and 296 in response to the signal present on the video enable line 188.

State Machine 250

Figure 6:
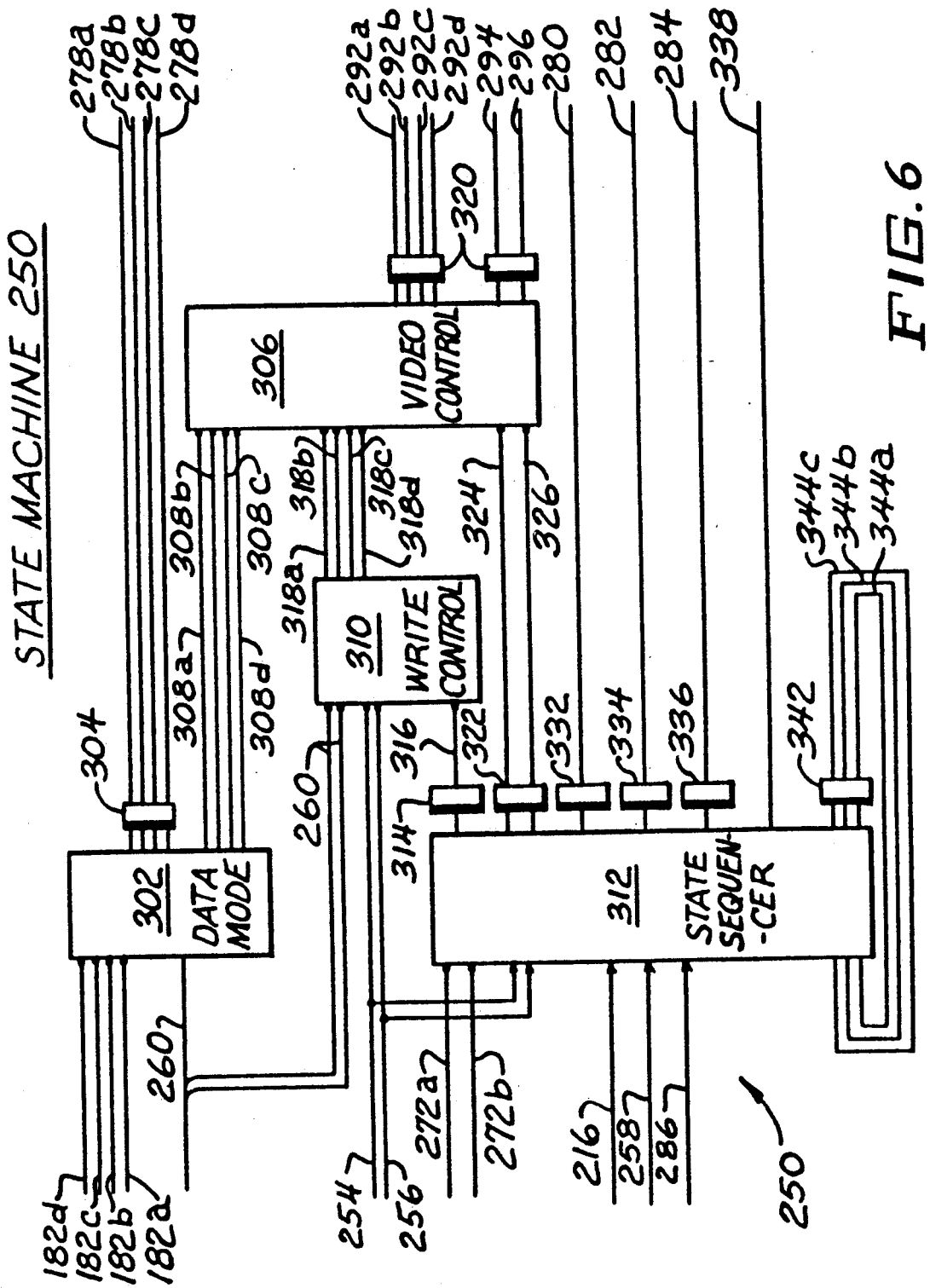
FIG. 6 is a block diagram depicting the state machine included in the CS functional unit illustrated in FIG. 3.

Referring to FIG. 6, the state machine 250 includes a data mode circuit 302. The data mode circuit 302 receives the output signals from the zero detectors 180a-d of the DP 140 via the signal lines 182a-d. The data mode circuit 302 also receives bits 0 through 3 from the DMA control register 222 via the mode control bus 260. Bits 0 and 1 of the DMA control register control whether only zero image data or only non-zero image data will be stored into the bit map memory 64. Bits 2 and 3 of the DMA control register 222 determine whether constant data or image data will be selected by the video output section 164 of the DP 140. In response to these input signals, the data mode circuit 302 produces signals that are transmitted by a latch 304 via lines 278a-d to the multiplexers 186a-d included in the video output section 164 of the DP 140. In response to these same input signals, the data mode circuit 302 also produces four write enable signals, one for each byte of image data to be stored into the bit map memory 64 during each memory cycle. The data mode circuit 302 transmits these write enable signals to a video control circuit 306 included in the state machine 250 via write enable signal lines 308a-d.

The state machine 250 also includes a write control circuit 310. The write control circuit 310 receives bits 4 and 5 from the DMA control register 222 via the mode control bus 260. These bits specify whether an image will be flipped about a vertical or horizontal axis. The write control circuit 310 also receives the SAG and DAG end of horizontal row signals via the signal lines 254 and 256. A state sequencer circuit 312 and a latch 314 supply the write control circuit 310 with a state machine halt signal via line 316. In response to these input signals, the write control circuit 310 produces four write inhibit signals, one for each byte of image data to be stored into the bit map memory 64 during each memory cycle. These four write inhibit signals, influence the storage or non-storage of image data at the beginning and end of each horizontal row. The write control circuit 310 transmits these write inhibit signals to the video control circuit 306 via write inhibit signal lines 318a-d.

The video control circuit 306 forms pairwise combinations of the four write enable signals from the data mode circuit 302 with the four write inhibit signals from the write control 310 to produce four video write signals. The four write control signals respectively control the storage of the individual bytes of image data transmitted by the DMA co-processor 130 to the bit map memory 64. Each individual byte of image data is stored if the data mode circuit 302 enables its storage and the write control circuit 310 does not inhibit its storage. The four video write control signals are transmitted through latches 320 to the memories 64 and 66 via the video write control signal lines 292a-d.

The video control circuit 306 also receives, through a latch 322, a row enable signal from the state sequencer 312 via line 324 and a column enable signal via a signal line 326. In response to these input signals, the video control circuit 306 produces the RAS and CAS signals that are transmitted, also through the latch 320, to the bit map memory 64 and the palette map memory 66 over the video RAS and video CAS signal lines 294 and 296.

The state sequencer 312 also produces the signals that are transmitted over the SAG multiplexer control signal bus 280, the DAG multiplexer control signal bus 282, and the DP multiplexer control signal bus 284 respectively through latches 332, 334 and 336. To influence the operation of the DMA run control circuit 262, illustrated in FIG. 3, when the state machine 250 is in a halted state, the state sequencer 312 produces a State 7 signal that is transmitted via a State 7 signal line 338 to the DMA run control circuit 262. Finally, a count indicating the present state of the state machine 250 is stored into a 3 bit latch 342 from the state sequencer 312.

To control the operation of the state sequencer 312, the state count is fed back as an input signal to the state sequencer via signal lines 344a–c. In addition, the state sequencer 312 receives additional input signals via the reset signal line 216, the SAG and DAG end of horizontal row signal lines 254 and 256, and the DAG end of object signal line 258. The state sequencer 312 also receives the DMA GOX and the DMA halt request signals via the 2 bit wide state machine run control bus 272, lines 272a and 272b (FIG. 6), together with the low order 2 bits of the X-coordinate destination address register 230 via the shift count signal bus 286.

Source Address Generation Unit 132

The DMA co-processor 130 processes rectangularly shaped image areas stored as contiguous, sequential locations in blocks of the image memory 34. Successive groups of four pixels in these rectangularly shaped image areas are processed sequentially from left to right across horizontal rows of the image area beginning in the upper left corner of the image and ending in its lower right corner.

Figure 7:
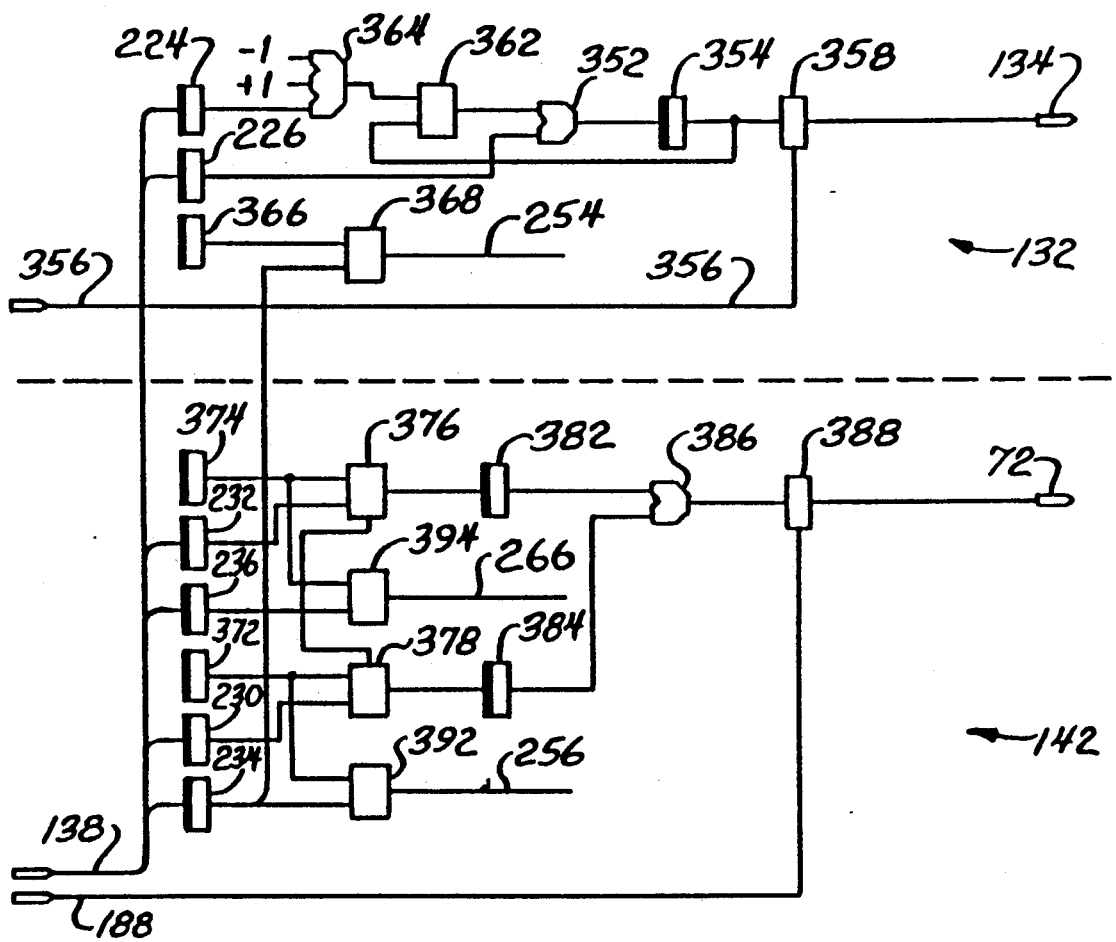
FIG. 7 is a block diagram depicting the SAG functional unit and the DAG functional unit included in the DMA co-processor illustrated in FIG. 1.

Referring to FIG. 7, there is depicted the SAG functional unit 132 included in the DMA co-processor 130. The SAG 132 generates the 3 byte addresses of locations in the image memory 34 from which image data is retrieved. The SAG 132 includes a 32 bit wide DMA source address register 226. The SAG 132 also includes the 8 bit wide DMA source address offset register 224. Prior to processing each rectangular image area the digital computer 22 initializes the DMA source address offset register 224 and the DMA source address register 226 by sequentially placing their respective addresses on the local address bus 26 while placing the addresses for the image memory 34 onto the image data bus 138 for storage into the registers 224 and 226.

To retrieve the first address in a rectangular image area, a multiplexer 352 first selects the low order 24 bits from the address present in the DMA source address register 226 and stores them into a 24 bit wide source address register 354 during each image's initial source address generation cycle. Whenever the DMA co-processor 130 is operating to process image data, in response to the DMA GOX signal, a 24 bit wide buffer 358 places the address in the source address register 354 onto the source address bus 134. To retrieve each succeeding 4 byte group of image data after the first, a number is added to the contents of the source address register 354 in an adder 362. The result of this addition is returned to the source address register 354 via the multiplexer 352 for use in retrieving the next 4 bytes of image data from the image memory 34.

The number which is added to the contents of the source address register 354 in the adder 362 is selected by an 8 bit wide 3-to-1 multiplexer 364. The number is either -1 or +1 hard wired into separate inputs of the multiplexer 364, or the contents of the DMA source address offset register 224.

The SAG 132 also includes a source count register 366. At the beginning of each horizontal row of the image, the source count register 366 is initialized to zero. Each time the signal on the source address enable signal line 356 causes data to be retrieved from the image memory 34, the number in the source count register 366 is incremented by one. A SAG end of row comparator 368 receives the low order 7 bits of the numbers present in both the source count register 366 and in the horizontal size register 234. When those two numbers become equal, the SAG end of row comparator 368 transmits an end of horizontal row signal over line 254 to the state machine 250. This end of horizontal row signal notifies the state machine 250 that the final 4 bytes of image data in the present horizontal row are being transferred from the image memory 34 to the DP 140. Accordingly, the state machine 250 can appropriately control the manipulation of those final 4 bytes of image data by the DP 140 together with their subsequent storage into the bit map memory 64, as well as preparing the DMA co-processor 130 to process the next horizontal row of image data.

Destination Address Generation Functional Unit 142

In addition to the SAG 132, FIG. 7 also depicts the DAG 142. The DAG 142 includes the DMA X-coordinate destination address register 230, the DMA Y-coordinate destination address register 232, the DMA horizontal size register 234, and the DMA vertical size register 236. Prior to processing each rectangular image area the digital computer 22 initializes the DMA X-coordinate destination address register 230, the DMA Y-coordinate destination address register 232, the DMA horizontal size register 234, and the DMA vertical size register 236 by sequentially placing their respective addresses on the local address bus 26 while simultaneously placing the addressing data for the bit map memory 64 onto the image data bus 138 for storage into the registers 230, 232, 234 and 236.

The DAG 142 includes a horizontal count register 372 and a vertical count register 374. At the beginning of each rectangular image area processed by the DMA co-processor 130, the horizontal count register 372 and the vertical count register 374 are initialized to zero. During each cycle of the DMA co-processor 130 in which manipulated image data is transferred from the DP 140 to the bit map memory 64, the count in the horizontal count register 372 is incremented by one. However, because 3 cycles of the DMA co-processor 130 are required for image data transfer through and manipulation within the DP 140, the count in the horizontal count register 372 lags by three the count in the source count register 366. Upon the transfer from the DP 140 to the bit map memory 64 of the final manipulated data in each horizontal row of image data retrieved from the image memory 34, the count in the vertical count register 374 is incremented by one and, simultaneously, the count in the horizontal count register 372 is reinitialized to zero.

The DAG 142 also includes a 9 bit wide row address adder 376 and a 7 bit wide column address adder 378. The row address adder 376 receives both the low order 9 bits from the DMA Y-coordinate destination address register 232 together with the low order 9 bits from the vertical count register 374 and adds them together to produce a 9 bit address of a row in the bit map memory 64. Upon the production of each 9 bit row address by the row address adder 376, the row address is transferred into a row address register 382. Differing from the row address adder 376, the column address adder 378 receives only bits 2 through 8 from the DMA X-address destination address register 230 together with the low order 7 bits from the horizontal count register 372 and adds them together to produce a 7 bit address of a column in the bit map memory 64. Upon the production of each 7 bit column address by the column address adder 378, the column address is transferred into a column address register 384.

The row address register 382 and the column address register 384 respectively present the row address and column addresses to an 8 bit wide 2-to-1 row-column address multiplexer 386. During the RAS cycle of the bit map memory 64, the multiplexer 386 selects the upper 8 bits of the row address present in the row address register 382 for transmission to the bit map memory 64. During the CAS cycle of the bit map memory 64, the multiplexer 386 selects the low bit of the row address present in the row address register 382 and all 7 bits of the column address present in the column address register 384 for transmission to the bit map memory 64. Thus, the multiplexer 386 successively forms the 8 bit row and column addresses respectively required during the RAS and CAS cycles by the dynamic VRAMS included in the bit map memory 64. When manipulated image data is to be transferred from the DP 140 into the bit map memory 64, a buffer 388 successively places the addresses selected by the multiplexer 386 from the row and column address registers 382 and 384 onto the video address bus 72. In this row-column addressing, the 9 bits of row address in the row address register 382 is capable of directly addressing 512 raster scan lines of a video display. Because each column address specifies the starting location for 4 pixels of image data in the bit map memory 64, the 7 bits of column address in the column address register 384, in combination with the image data manipulations that may be performed by the DP 140, are similarly capable of indirectly addressing all 512 pixels of image data along each raster scan line of a video display.

The DAG 142 also includes a DAG end of row comparator 392 that receives the low order 7 bits of the numbers present in both the horizontal count register 372 and in the horizontal size register 234. When those two numbers become equal, the DAG end of row comparator 392 transmits an end of horizontal row signal over line 256 to the state machine 250. This signal notifies the state machine 250 that the final bytes of image data in the present horizontal row are being transferred from the DP 140 to the bit map memory 64. Accordingly, the state machine 250 can appropriately prepare the DMA co-processor 130 to process the next horizontal row of image data.

The DAG 142 also includes a DAG end of object comparator 392 that receives the low order 9 bits of the numbers present in both the vertical count register 374 and in the vertical size register 236. When those two numbers become equal, the DAG end of object comparator 394 transmits an end of object signal over line 258 to the DMA run control circuit 262. This end of object signal notifies the DMA run control circuit 262 that the final horizontal row of image data is being transferred from the DP 140 to the bit map memory 64. Accordingly, the DMA run control circuit 262 can appropriately prepare the DMA co-processor 130 to complete the processing of the current image data.

Operation of the State Machine 250

FIG. 8 is a state transition diagram depicting the transitions that occur among the 7 states of the state machine 250. When the video game 20 is initialized, the state machine 250 enters a stopped state 402, State 1, in response to a general reset of the video game 20 indicated by the horizontal line 404. In the stopped state 402, the DMA co-processor 130 exercises no control over the busses 72, 78, 134 and 136 which it uses during its normal operation. However, in the stopped state the DMA co-processor 130 remains responsive to addresses received over the local address bus 26. Thus while the state machine 250 is in its stopped state, the digital computer 22 can store data into the registers 184, 222, 224, 226a, 226b, 230, 232, 234 and 236 included in the DMA co-processor 130. While the DMA GO bit in the DMA control register 222 remains negated, the state machine 250 remains in the stopped state during successive cycles of the DMA co-processor 130 as indicated by the looping line 406.

When the DMA GO bit in the DMA control register 222 is asserted and the DMA halt request signal on line 268 is negated, then during the next cycle the state machine transitions from state 1 to a source address start state, State 2, as indicated by an upwardly directed line 414. When the state machine 250 is in the source address start state, the SAG 132 generates the first source addresses for an image area and transmits it to the image memory 34 over the source address bus 134.

With the state machine 250 in the source address start state 412, if the DMA halt request signal remains negated during the next cycle of the DMA co-processor 130 the state machine 250 transitions to a flavor fill state 422, State 3, as indicated by an line 424. In the flavor fill state 422 of the state machine 250, the 4 bytes of image data specified by the first address from the SAG 132 is loaded into the time multiplex flavoring section 156 of the DP 140 where it is manipulated by the multiplexer 172. Concurrently with loading of image data into the time multiplex flavoring section 156, the SAG 132 generates the address for the second 4 bytes of image data to be retrieved from the image memory 34.

With the state machine 250 in the flavor fill state 422, if the DMA halt request signal remains negated during the next cycle of the DMA co-processor 130 the state machine 250 transitions to a zero fill state 432, State 4, as indicated by line 434. In the zero detect fill state 432, the first image data from the time multiplex flavoring section 156 is simultaneously presented both to the input latches 178a–d in the video output section 164 and to the zero detectors 180a–d. Concurrent with this the second 4 bytes of image data is simultaneously loaded into the time multiplex flavoring section 156. Again concurrent with the loading of the image data into the time multiplex flavoring section 156, the SAG 132 generates the address for the third four bytes of image data to be retrieved from the image memory 34.

If the DMA halt request signal is asserted at any time while the state machine 250 is in any of its second, third or fourth states 412, 422 or 432, the state machine 250 immediately returns to its stopped state 402, as indicated by line 436. If the state machine 250 returns to the stopped state 402 from any of the states 412, 422 or 432, it remains in the stopped state 402 until the DMA halt request signal is again negated and the DMA GO bit remains asserted.

With the state machine 250 in the zero detect fill state 432, if the DMA halt request signal remains negated during the next cycle of the DMA co-processor 130 the state machine 250 transitions to a RAS state 442, State 5, as indicated by line 444. In the RAS state 442, the DAG 142 generates the address of the location in the bit map memory 64 into which image data will be stored and the row address of that location is placed on the video address bus 72. The RAS state 442 occurs at the beginning of each horizontal row of image data and consumes 1 cycle of the DMA co-processor 130. Proper phasing of image data retrieval from the image memory 34 and its transfer through the DP 140 and subsequent storage of manipulated image data into the bit map memory 64 requires that all of these image data processing activities of the DMA co-processor be paused for those cycles during which the state machine 250 is in the RAS state 442.

With the state machine 250 in the RAS state 442, if the DMA halt request signal remains negated during the next cycle of the DMA co-processor 130 the state machine 250 transitions to a CAS state 452, State 6, as indicated by line 454. In the CAS state 452, a column address is placed on the video address bus 72 by the DAG 142 causing manipulated image data to be transmitted from the video output section 164 of the DP 140 and stored in the bit map memory 64. Concurrent with image data transfer from the video output section 164 to the bit map memory 64, image data manipulation continues in the sections 156, 160 and 164 together with address generation by both the SAG 132 and the DAG 142.

The state machine 250 remains in the CAS state 452 as indicated by the looping curved line 456 as long as the DMA halt request remains negated and the end of now signal is not received. Thus during each successive cycle of the DMA co-processor 130 image data is concurrently retrieved from the image memory 34, manipulated through the successive sections 156, 160 and 164 of the DP 140, and stored in the bit map memory 64.

Assertion of the DMA halt request signal causes the state machine 250 to transition from either the RAS state 442 or the CAS state 452 to a halted state 462, State 7, as indicated by curved line 464. When the state machine 250 enters the halted state 462, it transmits a DMA halted signal to the run control 262 over the State 7 signal line 338. While the DMA halt request signal remains asserted, the state machine 250 remains in the halted state 462, as indicated by the looping curved line 466, and all operations of the DMA co-processor 130 are suspended. When the DMA halt request signal is subsequently negated, the state machine 250 returns to the RAS state 442 as indicated by the downwardly directed line 468. Upon return to the RAS state 442, the DMA co-processor 130 resumes processing image data at the point it was suspended when the DMA halt request signal was initially asserted.

While the state machine 250 is in the CAS state 452, if the DAG 142 transmits the DAG end of horizontal row signal then during the next cycle of the DMA co-processor 130 the state machine 250 transitions from the CAS state 452 to the RAS state 442 as indicated by the downward directed line 474. Upon the state machine 250 reaching the RAS state 442, if the DAG 142 has not yet transmitted the DAG end of object signal, the state machine begins storing manipulated image data for the next horizontal row into the bit map memory 64. If the end of object signal has been transmitted then during the next cycle of the DMA co-processor 130 the state machine transitions to the stopped state 402 as indicated by the downwardly directed line 476. Thus, as described above, after the state machine 250 first enters the RAS state 442 it returns to the stopped state 402 only upon reaching the end of an image's data or upon reset of the video game 20.

Operation of the Video Game 20

During the normal operation of the video game 20, responding to supervisory commands from the digital computer 22 the DMA co-processor 130 supplies substantially all of the image data written into the bit map memory 64. Consequently, the digital computer 22 seldom if ever uses the buses 26, 52, 68, or 72 for retrieving data from or storing data to the various memories 34 or 64. Generally, the digital computer 22 only accesses these memories in executing diagnostic routines during initialization to determine that the respective memories are operating properly, and periodically during normal operation of the video game 20 to select the image data for each successive raster scan line in the memories 64 and 66 for transfer over the serial video data bus 68 to the color memory 42.

In addition to controlling the operation of the DMA co-processor 130 by assigning values to the bits of the DMA control register 222, the digital computer 22 controls the operation of other particular portions of the video game 20 by appropriately setting certain bits in a system control register 502 illustrated in FIG. 9. Thus by setting bit in the system control register 502, the digital computer 22 activates the automatic scene erasure feature of the video game 20 described above. Bit in controls activation or deactivation of the background generation circuit that may be included in the I/O functional unit 112. Bit selects one of the two complementary operating modes of the priority scheme for selecting between image data on the serial video data bus 68 and the background/road data bus 122 as described above. The digital computer chooses between the bidirectional buffer 80 or the palette latch 84 as the source of data for the palette memory 66 by appropriately setting or resetting bit. By appropriately setting bits and of the system control register 502 the digital computer 22 selects among 4 pages of memory included in the permanent scratch pad memory 46. Through the use of bits and the digital computer 22 can actually address 8 kilobytes of data in the permanent scratch pad memory 46 rather than the 2 kilobytes indicated by the address space of the memory 46 set forth in FIG. 4. As illustrated in FIG. 9, bits 8 through 15 of the control register 502 provide the unidirectional LED latch 110 for the diagnostic LED 108 included in the video game 20.

Because the independent operation of the digital computer 22 and the DMA co-processor 130 may occasionally result in both of them attempting to simultaneously place addresses on the video address bus 72 and/or the source address bus 134, possibly in combination with attempting to transmit or receive data on the parallel video data bus 78 and/or the image at a bus 138, the video game 20 includes a bus contention arbitration circuit of conventional design such as is well known in the art. This bus arbitration circuit is implemented in a Programmable Logic Array ("PLA") integrated circuit. As is apparent from the description of the state transition diagram for the state machine 250 depicted in FIG. 8, the primary consideration in arbitrating conflicting requests by the digital computer 22 and the DMA co-processor 130 is that the operation of neither be suspended prior to the completion of their respective CAS cycles during which they are accessing the bit map memory 64.

To arbitrate contentions between the digital computer 22 and the DMA co-processor 130, the bus arbitration circuit receives various signals produced by the computer 22 for controlling the generation of signals that drive the video display. In particular the bus arbitration circuit receives the signals from the GSP which indicate that it must select video data for a raster scan line from the memories 64 and 66 for transfer over the serial video data bus 68 to the color memory 42. This image data selection, which takes priority over image data processing by the DMA co-processor 130, occurs once per video raster scan line during the beam's retrace interval while it is moving from the end of one video raster scan line to the beginning of the next and while the beam is blanked.

To allow the bus arbitration circuit to resolve bus contention between the digital computer 22 and the DMA co-processor 130, the DMA co-processor provides the bus arbitration circuit with its 6 MHz clock frequency, the DMA GOX signal which indicates that the DMA co-processor 130 is processing image data, and the halt acknowledge signal which indicates that the DMA co-processor has halted image data processing in response to a halt request signal received from the bus arbitration circuit. To coordinate the operation of the DMA co-processor 130 with the digital computer 22, the bus arbitration circuit provides the DMA co-processor 130 with the halt request signal and the video enable signal.

In addition to the bus arbitration function described above, the PLA also provides control signals to the digital computer 22, the DMA co-processor 130, the bit map memory 64 and the palette map memory 66 that accomplish the automatic erasure of a scene stored in the bit map memory 64 in the manner described above.

As mentioned above, coordinated operation of the SAG 132, the DP 140 and the DAG 142 allows flipping images about horizontal and vertical axes of rotation and also clipping images. Regardless of the type of image flipping and clipping to be performed, the X-coordinate and Y-coordinate destination address registers 230 and 232 are always respectively loaded with the raster scan line address and the pixel address along that scan line into which the first byte of manipulated image data produced by the DP 140 will be stored. Further, at the end of each horizontal row of image data, as counted by the source count register 366, the multiplexer 364 selects the contents of the DMA source address offset register 224 rather than the numbers +1 or −1 for adding to the contents of the source address register 354. Finally, if there is to be no clipping the DMA horizontal size register 234 and the DMA vertical size register 236 are always loaded respectively with the number of pixels in each horizontal row of the image and with the number of horizontal rows in the image.

During operation of the DMA 130 in which there is no flipping or clipping of an image:

1. the DMA source address register 226 is loaded with the address of the initial storage location of the contiguous segment in the image memory 34 that contains an image's data; and 2. the DMA source address offset register 224 is loaded with the number +1.

Then, during successive cycles during which the SAG 132 produces a new address for a location in the image memory 34, (except for the first pixel in each row), the multiplexer 364 selects the number +1 to be added to the address in the source address register 354. The following table illustrates the contents of the source address register 354 during various cycles of the state machine 250 having 10 pixels per horizontal row beginning at the address 2000 in the image memory 34.

| Count in Source Count Register 366 | Data Selected by Multiplexer 364 | Contents of Source Address Register 354 |
|---|---|---|
| 0 | INIT | 2000 |
| 1 | +1 | 2001 |
| . | . | . |
| . | . | . |
| . | . | . |
| 9 | +1 | 2009 |
| 0 | +1 | 2010 |
| 1 | +1 | 2011 |
| . | . | . |
| . | . | . |

If an image is to be simultaneously flipped about both a horizontal and a vertical line of symmetry without clipping, from the preceding example it is apparent that:

1. the DMA source address register 226 is loaded with the address of the final storage location of the contiguous segment in the image memory 34 that contains an image's data; and 2. the DMA source address offset register 224 is loaded with the number −1.

Then, successive cycles (except for the first pixel in each row), the multiplexer 364 selects the number −1 to be added to the address in the source address register 354.

If an image is to be flipped about a vertical axis of rotation without clipping:

1. the DMA source address register 226 is loaded with the address of the final storage location for the first horizontal row of image data in the contiguous segment in the image memory 34 that contains an image's data; and 2. the DMA source address offset register 224 is loaded with one fewer than twice the number of pixels in the image's horizontal rows.

Then, during successive cycles (except for the first pixel in each row), the multiplexer 364 selects the number −1 to be added to the address in the source address register 354.

For example, if each row of an image contained 10 pixels and the image began at address 2000 in the image memory 34, then the DMA source address register 226 is loaded with the address 2009 and the DMA source address offset register 224 is loaded with the number 19. The following table illustrates the contents of the source address register 354 during various cycles of the state machine 250.

| Count in Source Count Register 366 | Data Selected by Multiplexer 364 | Contents of Source Address Register 354 |
|---|---|---|
| 0 | INIT | 2009 |
| 1 | −1 | 2008 |
| . | . | . |
| . | . | . |
| 9 | −1 | 2000 |
| 0 | +19 | 2019 |
| 1 | −1 | 2018 |
| . | . | . |
| . | . | . |

If an image is to be flipped about only a horizontal line of symmetry without clipping, from the preceding example it is apparent that:
1. the DMA source address register 226 is loaded with the address in the image memory 34 of the first storage location in the final row of the image; and
2. the DMA source address offset register 224 is loaded with a negative number whose magnitude is one fewer than twice the number of pixels in the image's horizontal rows.

Then, during successive cycles during (except for the first pixel in each row), the multiplexer 364 selects the number +1 to be added to the address in the source address register 354.

For example, if each row of an image contained 10 pixels, the image began at address 2000 in the image memory 34, and the image contained 20 horizontal rows of image data, then the DMA source address register 226 is loaded with the address 2190 and the DMA source address offset register 224 is loaded with the number −19. The following table illustrates the contents of the source address register 354 during various cycles of the state machine 250.

| Count in Source Count Register 366 | Data Selected by Multiplexer 364 | Contents of Source Address Register 354 |
|---|---|---|
| 0 | INIT | 2190 |
| 1 | +1 | 2191 |
| . | . | . |
| . | . | . |
| 9 | +1 | 2199 |
| 0 | −19 | 2180 |
| 1 | +1 | 2181 |
| . | . | . |
| . | . | . |
| 9 | +1 | 2019 |
| 0 | −19 | 2000 |
| 1 | +1 | 2001 |
| . | . | . |
| . | . | . |
| 9 | +1 | 2009 |

If an image is to be clipped, then either the DMA horizontal size register 234 or the DMA vertical size register 236, or both of them, are loaded respectively with numbers that are smaller than the number of pixels in each horizontal row of the image and/or smaller than the number of horizontal rows in the image. For vertical clipping, the DMA vertical size register 236 is loaded with a number that is smaller than the number of horizontal rows in the image. As is readily apparent, this will cause the DMA 130 to retrieve only a portion of the image's full height from the image memory 34.

For horizontal clipping, the DMA horizontal size register 234 is loaded with a number that is smaller than the number of horizontal rows in the image which causes the SAG 132 to increment or decrement the contents of the source address register 354 fewer times before adding the contents of the DMA source address offset register 224 to those of the source address register 354. However, loading the appropriate value into the DMA source address offset register 224 will cause the location specified by the source address register 354 to be the proper one for retrieving the reduced number of pixels from each successive horizontal row of image data.

For example, during operation of the DMA 130 in which there is to be only horizontal clipping of an image without any flipping:
1. the DMA source address register 226 is loaded with the address in the image memory 34 of the first pixel in the first row of image data;
2. the DMA horizontal size register 234 is loaded with the number of pixels that are to appear in each horizontal row of the clipped image; and
3. the DMA source address offset register 224 is loaded with the number one greater than the number of pixels that are to be omitted from each row of the clipped image.

Then during successive cycles during which the SAG 132 produces a new address for a location in the image memory 34, (except for the first pixel in each row), the multiplexer 364 selects the number +1 to be added to the address in the source address register 354. The following table illustrates the contents of the source address register 354 during various cycles of the state machine 250 for an image having 10 pixels per horizontal row beginning at address 2000 in the image memory 34 of which the first three pixels are to be clipped off.

| Count in Source Count Register 366 | Data Selected by Multiplexer 364 | Contents of Source Address Register 354 |
|---|---|---|
| 0 | INIT | 2003 |
| 1 | +1 | 2004 |
| . | . | . |
| . | . | . |
| 7 | +1 | 2009 |
| 0 | +4 | 2013 |
| 1 | +1 | 2014 |
| . | . | . |
| . | . | . |

Alternatively, during operation of the DMA 130 in which the image is to be both clipped horizontal and flipped about a vertical axis:
1. the DMA source address register 226 is loaded with the address in the image memory 34 of the last pixel in the first row of image data;
2. the DMA horizontal size register 234 is loaded with the number of pixels that are to appear in each horizontal row of the clipped image; and
3. the DMA source address offset register 224 is loaded with a number equal to twice the number of pixels in each row of the image data minus the number one greater than the number of pixels that are to be omitted from each row of the clipped image.

Then during successive cycles (except for the first pixel in each row), the multiplexer 364 selects the number −1 to be added to the address in the source address register 354. The following table illustrates the contents of the source address register 354 during various cycles of the state machine 250 for an image having 10 pixels per horizontal row beginning at address 2000 in the image memory 34 of which the final three pixels are to be clipped off and the image rotated about a vertical axis.

| Count in Source Count Register 366 | Data Selected by Multiplexer 364 | Contents of Source Address Register 354 |
|---|---|---|
| 0 | INIT | 2006 |
| 1 | +1 | 2005 |
| . | . | . |
| . | . | . |
| . | . | . |
| 7 | +1 | 2000 |
| 0 | +16 | 2016 |
| 1 | +1 | 2015 |
| . | . | . |
| . | . | . |
| . | . | . |

Applying the general principles illustrated in the preceding examples, by storing the proper addresses, counts and offset in the DMA source address offset register 224, the DMA address register 226, and both the DMA horizontal and vertical size registers 234 and 236, it is possible for the DMA co-processor 130 to manipulate an image's data to produce an desired combination of flipping about a horizontal and/or a vertical axis together with any desired horizontal and/or vertical clipping.

Although the present invention has been described in terms of the presently preferred embodiment, it is to be understood that such disclosure is purely illustrative and is not to be interpreted as limiting. Consequently, without departing form the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. In a video game having a display system including a raster scan line video display unit, a supervisory digital computer for supervising the operation of the display system, a program memory that contains a computer program executed by the supervisory digital computer, an image memory that contains data for a plurality of images, a bit map memory for receiving and storing image data and for supplying such stored image data for display on the video display unit, and means for allowing a player of the video game to interact with the supervisory digital computer's execution of the computer program to change the scene presented on the video display unit, the improvement which comprises:

a Direct Memory Access ("DMA") co-processor operable under the control of signals from the supervisory digital computer for processing a raster scan video image, said DMA co-processor including:

a) Source Address Generation ("SAG") means for generating addresses of locations in the image memory from which image data is retrieved;

b) Data Pipe ("DP") means for receiving image data from locations in said image memory addressed by said SAG means, and for permitting pixel and image manipulation of such image data to adapt it for display on the video display unit prior to storing the manipulated data into the bit map memory;

c) Destination Address Generation ("DAG") means for generating addresses of locations in said bit map memory into which image data is stored after having been manipulated by said DP means;

d) Control Section ("CS") means for controlling the operation of said SAG means, said DP means and said DAG means in response to supervisory control signals received by said CS means from the supervisory digital computer;

e) a first data bus between said DP means and said image memory for transferring said image data from said image memory to said DP means prior to manipulation by said DP means, and;

f) a second data bus between said DP means and said bit map memory for transferring said image data from said DP means to said bit map memory after manipulation by said DP means.

2. The video game of claim 1 further comprising:

(a) a palette map memory operating in parallel with the bit map memory for receiving and storing palette data and for supplying such stored palette data to the video display unit simultaneously with transfer of stored image data to the video display unit;

(b) a color map memory for receiving (1) image data from said bit map memory and (2) palette data from the palette map memory, and for converting such data into data specifying a color to be displayed on the video display unit.

3. The video game of claim 1 further comprising auto-erase means for automatically erasing each raster scan line of image data stored in the bit map memory immediately following the display of that raster scan line of image data on the video display unit.

4. The video game of claim 1 further comprising background generation means for generating background image data and for supplying such background image data to the video display unit, said background image data being generated independently from the image data supplied to the video display unit by the bit map memory.

5. The video game of claim 4 further comprising a priority selection means for selecting between image data from the bit map memory and the background image data for display on the video display unit, said priority selection means being controlled by the digital computer so that in a first operating mode the image data from the bit map memory has priority over and overwrites the background image data and in a second operating mode the background image data has priority over and overwrites the image data from the bit map memory.

6. The video game of claim 1 further comprising audio generation means for generating audible sounds in response to data provided to said audio generation means by said digital computer.

7. The video game of claim 1 wherein said DP of said DMA co-processor includes means for manipulating the retrieved image data by shifting such image data laterally along the video raster scan line.

8. The video game of claim 1 wherein said DP of said DMA co-processor includes means for manipulating the retrieved image data by testing each pixel's image data and selectively displaying either the tested pixel's image data or other data depending upon the outcome of said test.

9. The video game of claim 1 wherein the SAG means and DAG means include means for manipulating (a) the address from which image data is retrieved from the image memory and, (b) the addresses of the locations into which such data is stored to permit clipping and flipping of the video image.

10. A video display system comprising
a raster scan line video display unit for displaying scenes;
supervisory digital computer means for supervising the operation of the video display system;
program memory means for storing a computer program executed by the supervisory digital computer;
image memory means for storing data for a plurality of images;
bit map memory means for receiving and storing image data and for supplying such stored image data for display on the video display unit, and;
a Direct Memory Access ("DMA") co-processor operable under the control of signals from the supervisory digital computer for processing a raster scan video image, said DMA co-processor including:
a) Source Address Generation ("SAG") means for generating addresses of locations in the image memory from which image data is retrieved;
b) Data Pipe ("DP") means for receiving image data from locations in said image memory addressed by said SAG means, and for permitting pixel and image manipulation of such image data to adapt it for display on the video display unit prior to storing the manipulated data into the bit map memory;
c) Destination Address Generation ("DAG") means for generating addresses of locations in said bit map memory into which image data is stored after having been manipulated by said DP means;
d) Control Section ("CS") means for controlling the operation of said SAG means, said DP means and said DAG means in response to supervisory control signals received by said CS means from the supervisory digital computer;
e) a first data bus between said DP means and said image memory for transferring said image data from said image memory to said DP means prior to manipulation by said DP means, and;
f) a second data bus between said DP means and said bit map memory for transferring said image data from said DP means to said bit map memory after manipulation by said DP means.

11. The video game of claim 10 further comprising:
(a) a palette map memory operating in parallel with the bit map memory for receiving and storing palette data and for supplying such stored palette data to the video display unit simultaneously with transfer of stored image data to the video display unit.
(b) a color map memory for receiving (1) image data from said bit map memory and (2) palette data from the palette map memory and for converting such data into data specifying a color to be displayed on the video display unit.

12. The video display system of claim 10 further comprising auto-erase means for automatically erasing each raster scan line of image data stored in the bit map memory immediately following the display of that raster scan line of image data on the video display unit.

13. The video display system of claim 10 further comprising operator control means for allowing an operator of the video display system to interact with the supervisory digital computer's execution of the computer program to change the scene presented on the video display unit.

14. The video display system of claim 10 wherein said DP of said DMA co-processor includes means for manipulating the retrieved image data by shifting such image data laterally along the video raster scan line.

15. The video display system of claim 10 wherein said DP of said DMA co-processor includes means for manipulating the retrieved image data by testing each pixel's image data and selectively displaying either the tested pixel's image data or other data depending upon the outcome of said test.

16. The video display system of claim 10 wherein the SAG means and the DAG means include means for manipulating: (a) the addresses from which image data is retrieved from the image memory (b) the addresses into which manipulated image data is stored in the bit map memory to permit clipping and/or flipping of the video image.

17. A Direct Memory Access ("DMA") co-processor operable under the control of signals from a supervisory digital computer for use in a video display system for processing a raster scan video image, the video display system including a raster scan line video display for displaying scenes, a program memory which contains a computer program executed by the supervisory digital computer, an image memory which contains data for a plurality of images, and a bit map memory for receiving and storing image data in a format adapted for display on said video display and for supplying such stored image data to the video display unit, said DMA co-processor comprising:
a) Source Address Generation ("SAG") means for generating addresses of locations in the image memory from which image data is retrieved;
b) Data Pipe ("DP") means for receiving image data from locations in said image memory addressed by said SAG means, and for permitting pixel and image manipulation of such image data to adapt it for display on the video display unit prior to storing the manipulated data into the bit map memory;
c) Destination Address Generation ("DAG") means for generating address of locations in said bit map memory into which image data is stored after having been manipulated by said DP means;
d) Control Section ("CS") means for controlling the operation of said SAG means, said DP means and said DAG means in response to supervisory control signals received by said CS means from the supervisory digital computer;
e) a first data bus between said DP means and said image memory for transferring said image data from said image memory to said DP means prior to manipulation by said DP means, and;
f) a second data bus between said DP means and said bit map memory for transferring said image data from said DP means to said bit map memory after manipulation by said DP means.

18. The DMA co-processor of claim 17 wherein said DP includes means for manipulating the retrieved image data by shifting such image data laterally along the video raster scan line.

19. The DMA co-processor of claim 17 wherein said DP includes means for manipulating the retrieved image data by testing each pixel's image data and selectively displaying either the tested pixel's image data or other data depending upon the outcome of said test.

20. The DMA co-processor of claim 17 wherein the SAG means and the DAG means include means for manipulating: (a) the addresses from which image data is retrieved from the image memory (b) the addresses into which manipulated image data is stored in the bit map memory to permit clipping and/or flipping of the video image.

* * * * *